(12) United States Patent
Zoellner et al.

(10) Patent No.: US 10,851,931 B2
(45) Date of Patent: Dec. 1, 2020

(54) FLUID MANIFOLD AND METHOD OF MAKING SAME

(71) Applicant: SAINT-GOBAIN PERFORMANCE PLASTICS CORPORATION, Solon, OH (US)

(72) Inventors: Clemens E. Zoellner, Bay City, MI (US); Jason Osentoski, Gladwin, MI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 62 days.

(21) Appl. No.: 16/158,436

(22) Filed: Oct. 12, 2018

(65) Prior Publication Data

US 2019/0113166 A1   Apr. 18, 2019

Related U.S. Application Data

(60) Provisional application No. 62/572,119, filed on Oct. 13, 2017.

(51) Int. Cl.

| *F16L 47/32* | (2006.01) |
|---|---|
| *B29C 33/00* | (2006.01) |
| *B29C 45/26* | (2006.01) |
| *F16L 41/03* | (2006.01) |

(52) U.S. Cl.
CPC .......... *F16L 47/32* (2013.01); *B29C 33/0033* (2013.01); *B29C 45/2624* (2013.01); *B29C 45/2626* (2013.01); *B29C 45/2628* (2013.01); *F16L 41/03* (2013.01)

(58) Field of Classification Search
CPC .. F16L 47/32; F16L 41/03; F16K 7/04; F16K 7/063; F16K 7/066; F16K 7/065
See application file for complete search history.

(56) References Cited

U.S. PATENT DOCUMENTS

| 5,423,769 A | 6/1995 | Jonkman et al. |
| 5,738,662 A | 4/1998 | Shannon et al. |
| 6,082,780 A * | 7/2000 | Rowley ............. B29C 45/14336 264/271.1 |
| 6,432,345 B1 | 8/2002 | Warburton-Pitt |
| 2010/0288385 A1* | 11/2010 | Gagne ....................... F16K 7/06 137/862 |

(Continued)

OTHER PUBLICATIONS

International Search Report and Written Opinion for PCT/US2018/055546 dated Jan. 22, 2019, 14 pages.

*Primary Examiner* — Michael R Reid
(74) *Attorney, Agent, or Firm* — Abel Schillinger, LLP; Chi Suk Kim

(57) ABSTRACT

A fluid manifold may include a body that may include a proximal end, a distal end, and a primary manifold component extending from the proximal end of the body to the distal end of the body and enclosing a primary channel. The fluid manifold may further include at least one auxiliary manifold component diverging from the primary manifold component and enclosing an auxiliary channel connected to the primary channel at a primary channel exit port. The fluid manifold may further include at least one compression valve region disposed along the body of the manifold where the compression valve region may be operable between an open position and a closed position.

19 Claims, 16 Drawing Sheets

(56) References Cited

U.S. PATENT DOCUMENTS

| | | |
|---|---|---|
| 2015/0041009 A1 | 2/2015 | Gebauer et al. |
| 2016/0195208 A1* | 7/2016 | Cassiday .............. F16L 41/021 285/125.1 |
| 2016/0369902 A1 | 12/2016 | Gagne et al. |

\* cited by examiner

FLUID MANIFOLD AND METHOD OF MAKING SAME

CROSS-REFERENCE TO RELATED APPLICATION(S)

This application claims priority under 35 U.S.C. § 119(e) to U.S. Patent Application No. 62/572,119 entitled "FLUID MANIFOLD AND METHOD OF MAKING SAME," by Clemens E. ZOELLNER et al., filed Oct. 13, 2017, which is assigned to the current assignee hereof and incorporated herein by reference in its entirety.

FIELD OF THE DISCLOSURE

The present disclosure relates to a fluid manifold, and more particularly, to a polymer based fluid manifold with a compression valve region located along the body of the fluid manifold.

BACKGROUND

Fluid manifolds are used in a variety of applications. The biopharmaceutical manufacturing industry has made use of fluid manifolds to transport media used in manufacturing processes. Such manifolds may contain reactants, reaction products, solvents, diluents, buffers, or other liquids used in manufacturing. However, many fluid manifold designs used in this industry experience reduced performance due to an inability to efficiently transport media. In particular, many manifolds used in the industry experience reduced fluid flow in the various regions near or adjacent exit ports from the main manifold body or near or adjacent to valves that are incorporated down stream from the manifolds, for instance, as part of or acting upon auxiliary tubing connected to the manifolds. This can result in a portion of the fluid passing through the fluid manifold becoming stagnant, a structural condition of the manifold referred to as a "dead zone." Stagnant fluid in the manifold or in tubing connected to the manifolds near exit ports can result in subsequent contamination of the transport media, reactants, reaction products, solvents, diluents, buffers, or other liquids flowing through the manifold. Accordingly, there remains a need for fluid manifolds that have improved performance in such applications.

SUMMARY

According to one aspect, a fluid manifold may include a body that may include a proximal end, a distal end, and a primary manifold component extending from the proximal end of the body to the distal end of the body and enclosing a primary channel. The fluid manifold may further include at least one auxiliary manifold component diverging from the primary manifold component and enclosing an auxiliary channel connected to the primary channel at a primary channel exit port. The fluid manifold may further include at least one compression valve region disposed along the body of the manifold. The at least one compression valve region may be operable between an open position and a closed position such that when in the closed position fluid flow through the manifold may be restricted from at least one of flowing through the primary channel, and flowing out of the primary channel into the auxiliary channel.

According to yet another aspect, a fluid manifold assembly may include a fluid manifold. The fluid manifold may include a body that may include a proximal end, a distal end, and a primary manifold component extending from the proximal end of the body to the distal end of the body and enclosing a primary channel. The fluid manifold may further include at least one auxiliary manifold component diverging from the primary manifold component and enclosing an auxiliary channel connected to the primary channel at a primary channel exit port. The fluid manifold may further include at least one compression valve region disposed along the body of the manifold. The at least one compression valve region may be operable between an open position and a closed position such that when in the closed position fluid flow through the manifold may be restricted from at least one of flowing through the primary channel, and flowing out of the primary channel into the auxiliary channel. The fluid manifold assembly may further include a clamping component disposed at the at least one compression valve regions of the fluid manifold.

BRIEF DESCRIPTION OF THE DRAWINGS

Embodiments are illustrated by way of example and are not limited in the accompanying figures.

Figure 1A:
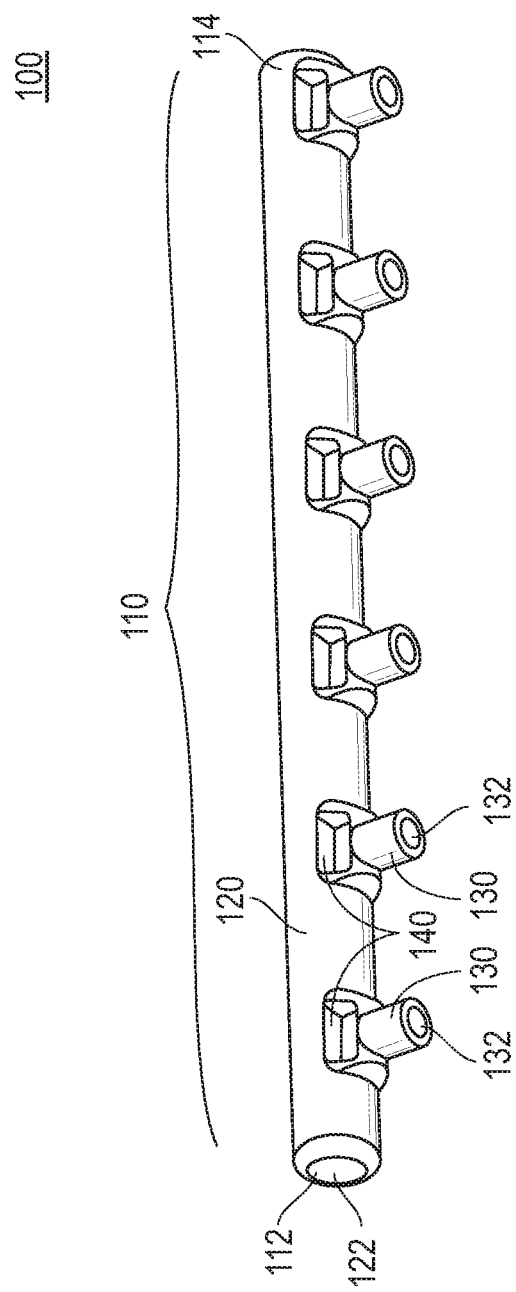
FIG. 1a includes an illustration of a perspective view of a fluid manifold according to certain embodiments descried herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Further, the use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control arts.

Embodiments described herein are generally directed to a fluid manifold having a body that may include a primary manifold component, at least one auxiliary manifold component diverging from the primary manifold component, and at least one compression valve region disposed along the body of the fluid manifold that is operable between an open position and a closed position such that when in the closed position fluid flow is either restricted from flowing through the primary channel or from flowing out of the primary channel into the auxiliary channel.

These concepts are better understood in view of the embodiments described below that illustrate and do not limit the scope of the present disclosure.

FIG. 1a includes an illustration of a perspective view of a fluid manifold 100 according to certain embodiments described herein. According to a particular embodiment, and as shown in FIG. 1a, the fluid manifold 100 may have a body 110 that may include a proximal end 112, a distal end 114, and a primary manifold component 120 extending from the proximal end 112 to the distal end 114. The primary manifold component 120 may enclose a primary channel 122. The body 110 may further include at least one auxiliary manifold component 130 diverging from the primary manifold component 120. The auxiliary manifold component 130 may enclose an auxiliary channel 132 connected to the primary channel 122. The body 110 may further include at least one compression valve region 140 disposed between the primary manifold component 120 and the auxiliary manifold component 130. According to certain embodiments, the compression valve region 140 may be operable between an open position and a closed position.

Figure 1B:
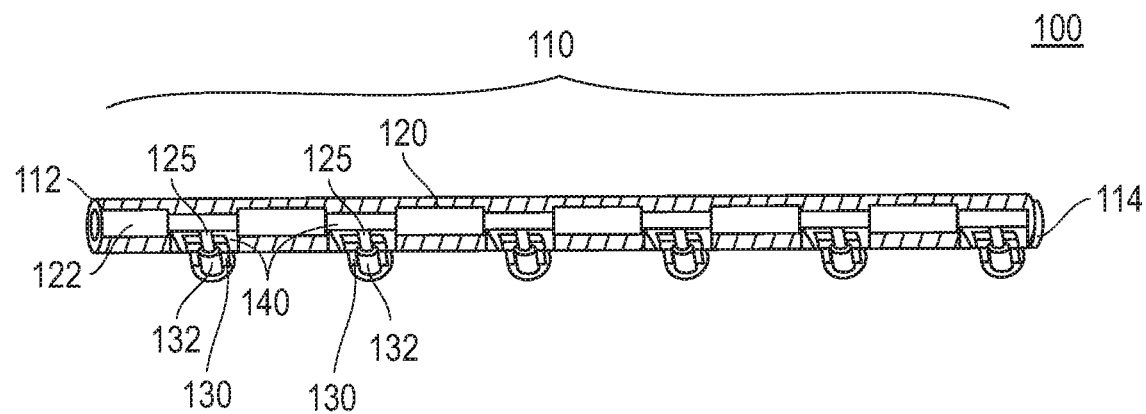
FIG. 1b includes an illustration of a perspective view of a cross-section of the fluid manifold of FIG. 1a according to certain embodiments descried herein.
Figure 1C:
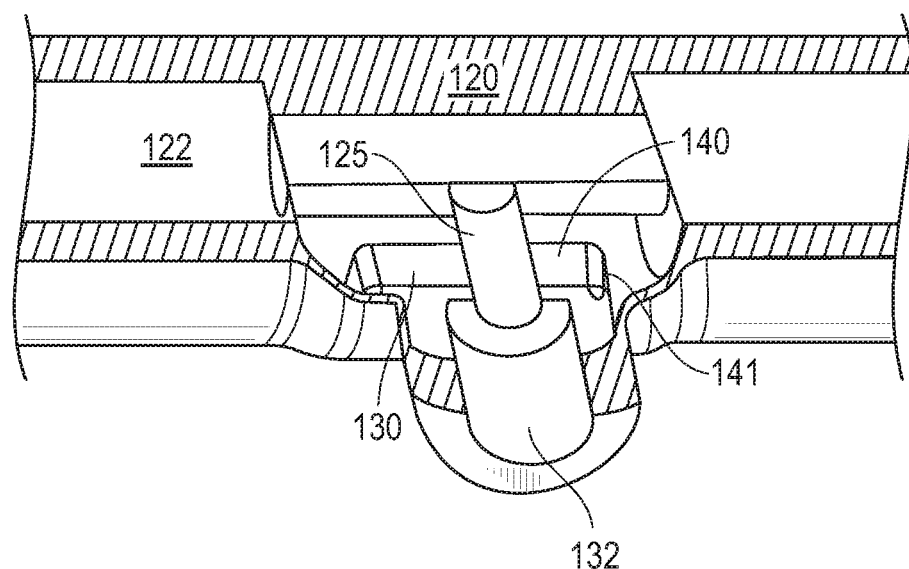
FIG. 1c includes an illustration of a region of the perspective view of a cross-section of the fluid manifold of FIG. 1a according to certain embodiments descried herein.

FIG. 1b includes a perspective view cross-section of the fluid manifold 100 of FIG. 1a showing the internal cavities of the fluid manifold 100. FIG. 1c includes a perspective view cross-section of a portion of the fluid manifold 100 of FIG. 1a showing the compression valve region 140. According to an embodiment, and as shown in FIGS. 1b and 1c, the auxiliary channel 132 may be connected to the primary channel 122 at a primary channel exit port 125 leading out of the primary channel 125, through the at least one compression valve region 140 and into the auxiliary channel 132.

According to particular embodiments described herein, the body 110 may include any desirable number of auxiliary manifold components 130 diverging from the primary manifold component 120. According to certain embodiments, the body 110 may include a particular number of auxiliary manifold components 130 diverging from the primary manifold component 120. For example, the body 110 may include at least about 2 auxiliary manifold components 130 diverging from the primary manifold component 120, such as, at least about 3 auxiliary manifold components 130 diverging from the primary manifold component 120 or at least about 4 auxiliary manifold components 130 diverging from the primary manifold component 120 or at least about 5 auxiliary manifold components 130 diverging from the primary manifold component 120 or at least about 6 auxiliary manifold components 130 diverging from the primary manifold component 120 or at least about 7 auxiliary manifold components 130 diverging from the primary manifold component 120 or at least about 8 auxiliary manifold components 130 diverging from the primary manifold component 120 or at least about 9 auxiliary manifold components 130 diverging from the primary manifold component 120 or even at least about 10 auxiliary manifold components 130 diverging from the primary manifold component 120.

According to still other embodiments, the body 110 may include any desirable number of compression valve regions disposed between the primary manifold component 120 and an auxiliary manifold component 130. According to yet other embodiments, the body 110 may include a particular number of compression valve regions 140 disposed between the primary manifold component 120 and an auxiliary manifold component 130. For example, the body 110 may include at least about 2 compression valve regions 140 disposed between the primary manifold component 120 and an auxiliary manifold component 130, such as, at least about 3 compression valve regions 140 disposed between the primary manifold component 120 and an auxiliary manifold component 130 or at least about 4 compression valve regions 140 disposed between the primary manifold component 120 and an auxiliary manifold component 130 or at least about 5 compression valve regions 140 disposed between the primary manifold component 120 and an auxiliary manifold component 130 or at least about 6 compression valve regions 140 disposed between the primary manifold component 120 and an auxiliary manifold component 130 or at least about 7 compression valve regions 140 disposed between the primary manifold component 120 and an auxiliary manifold component 130 or at least about 8 compression valve regions 140 disposed between the primary manifold component 120 and an auxiliary manifold component 130 or at least about 9 compression valve regions 140 disposed between the primary manifold component 120 and an auxiliary manifold component 130 or even at least about compression valve regions 140 disposed between the primary manifold component 120 and an auxiliary manifold component 130. According to still other embodiments, the body 110 may have a compression valve regions 140 disposed between the primary manifold component 120 and each auxiliary manifold component 130.

According to other embodiments, and as shown in FIGS. 1a, 1b, and 1c, the compression valve region may be a primary channel exit port valve. According to still other embodiments, and as shown in FIGS. 1a, 1b, and 1c, a primary channel exit port valve may be disposed along the body 110 between the primary manifold component 120 and the auxiliary manifold component 130. According to still other embodiments, and as shown in FIGS. 1a, 1b and 1c, a primary channel exit port valve may be disposed along the body 110 at the primary channel exit port 125. According to yet other embodiments, and as shown in FIGS. 1a, 1b, and 1c, a primary channel exit port valve may be disposed along the body 110 such that when the compression valve region 140 is in a closed position, fluid flow through the body 110 is restricted from flowing out of the primary channel 122 and into the auxiliary channel 132. According to still other embodiments, and as shown in FIGS. 1a, 1b, and 1c, a primary channel exit port valve is disposed along the body 110 such that when the compression valve region 140 is in a closed position, fluid flow through the body 110 is restricted from flowing through the primary channel exit port 125.

According to yet other embodiments, the primary channel exit port valve may be disposed along the body 110 such that when the compression valve region 140 is in a closed position, a compressed portion of compression valve region 140 restricts fluid flow from the primary channel 122 into the auxiliary channel 132. According to still other embodiments, and as shown in FIGS. 1a, 1b, and 1c, the primary channel exit port valve may be disposed along the body 110 such that when the compression valve region 140 is in a closed position, the compressed portion of compression valve region 140 that restricts the fluid flow is generally flush with an interior wall of the primary manifold component 130.

According to still other embodiments, the primary channel exit port valve may be disposed along the body 110 such that when the compression valve region 140 is in a closed position, a region of the primary channel spanning the length of the compression valve region 140 has a particular Longitudinal Dead Space Factor (LDSF). As used in referenced to embodiments described herein, the Longitudinal Dead Space Factor (LDSF) is defined by the equation LDSF=$|ACP_{PC}-ACP_{CR}|/ACP_{PC}$, where $ACP_{PC}$ is equal to an average cross-sectional perimeter of the primary channel between the proximal end of the body and the distal end of the body, and where $ACP_{CR}$ is equal to an average cross-sectional perimeter of the primary channel spanning the length of the compression valve region. According to particular embodiments, the Longitudinal Dead Space Factor (LDSF) of the compression valve region 140 may be not greater than about 0.5, such as, not greater than about 0.45 or not greater than about 0.4 or not greater than about 0.35 or not greater than about 0.3 or not greater than about 0.25 or not greater than about 0.2 or not greater than about 0.15 or not greater than about 0.1 or even not greater than about 0.01. It will be appreciated that the Longitudinal Dead Space Factor (LDSF) of the compression valve region 140 may be within a range between any of the values noted above. It will be further appreciated that the Longitudinal Dead Space Factor (LDSF) of the compression valve region 140 may be any value between any of the values noted above.

According to yet other embodiments, the primary channel exit port valve may be disposed along the body 110 such that when the compression valve region 140 is in a closed position, the body 110 has substantially no dead space. According to yet other embodiments, the primary channel exit port valve may be disposed along the body 110 such that when the compression valve region 140 is in a closed position, the body 110 has no dead space. According to yet other embodiments, the primary channel exit port valve may be disposed along the body 110 such that when the compression valve region 140 is in a closed position, the body 110 has substantially no stagnant fluid flow. According to yet other embodiments, the primary channel exit port valve may be disposed along the body 110 such that when the compression valve region 140 is in a closed position, the body 110 has no stagnant fluid flow.

Figure 2:
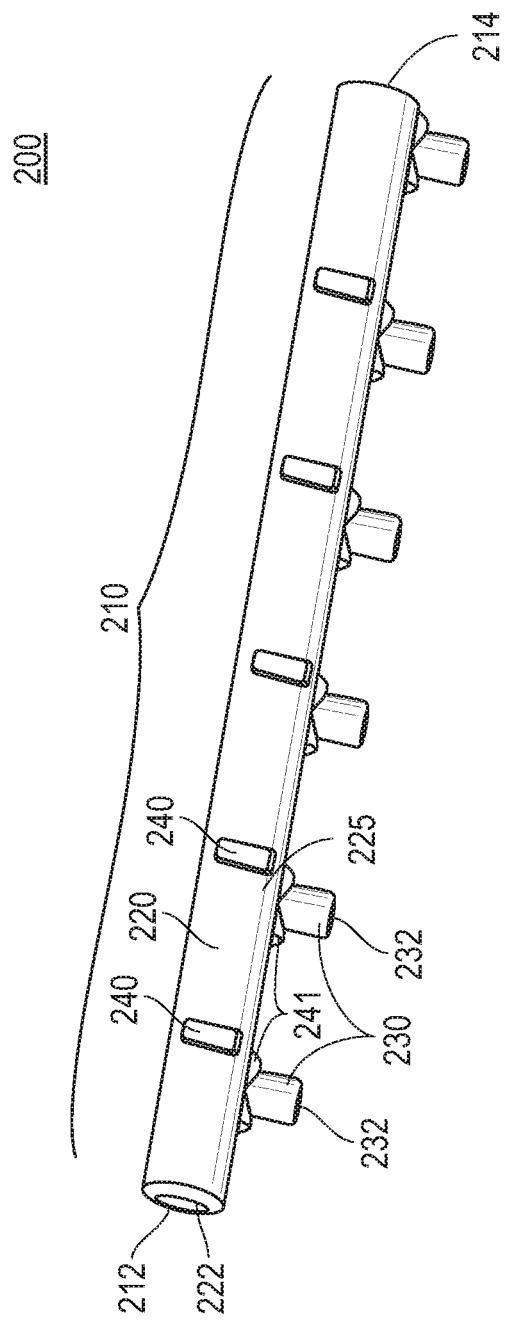
FIG. 2 includes an illustration of a perspective view of a fluid manifold according to certain embodiments descried herein.

FIG. 2 includes an illustration of a perspective view of a fluid manifold 200 according to other embodiments described herein. According to an embodiment and as shown in FIG. 2, the fluid manifold 200 may have a body 210 that may include a proximal end 212, a distal end 214 and a primary manifold component 220 extending from the proximal end 212 to the distal end 214. The primary manifold component 220 may enclose a primary channel 222. The body 210 may further include at least one auxiliary manifold component 230 diverging from the primary manifold component 220. The auxiliary manifold component 230 may enclose an auxiliary channel 232 connected to the primary channel 222. The body 210 may further include at least one compression valve region 240 disposed along the primary manifold component 220 adjacent to the auxiliary manifold component 230. According to certain embodiments, the compression valve region 240 may be operable between an open position and a closed position.

According to particular embodiments, the body 210 may include any desirable number of auxiliary manifold components 230 diverging from the primary manifold component 220. According to certain embodiments, the body 210 may include a particular number of auxiliary manifold components 230 diverging from the primary manifold component 220. For example, the body 210 may include at least about 2 auxiliary manifold components 230 diverging from the primary manifold component 220, such as, at least about 3 auxiliary manifold components 230 diverging from the primary manifold component 220 or at least about 4 auxiliary manifold components 230 diverging from the primary manifold component 220 or at least about 5 auxiliary manifold components 230 diverging from the primary manifold component 220 or at least about 6 auxiliary manifold components 230 diverging from the primary manifold component 220 or at least about 7 auxiliary manifold components 230 diverging from the primary manifold component 220 or at least about 8 auxiliary manifold components 230 diverging from the primary manifold component 220 or at least about 9 auxiliary manifold components 230 diverging from the primary manifold component 220 or even at least about 10 auxiliary manifold components 230 diverging from the primary manifold component 220.

According to still other embodiments, the body 210 may include any desirable number of compression valve regions disposed along the primary manifold component 220 adjacent to the auxiliary manifold component 230. According to yet other embodiments, the body 210 may include a particular number of compression valve regions 240 disposed along the primary manifold component 220 adjacent to the auxiliary manifold component 230. For example, the body 210 may include at least about 2 compression valve regions disposed along the primary manifold component 220 adjacent to the auxiliary manifold component 230, such as, at least about 3 compression valve regions 240 disposed along the primary manifold component 220 adjacent to the auxiliary manifold component 230 or at least about 4 compression valve regions 240 disposed along the primary manifold component 220 adjacent to the auxiliary manifold component 230 or at least about 5 compression valve regions 240 disposed along the primary manifold component 220 adjacent to the auxiliary manifold component 230 or at least about 6 compression valve regions 240 disposed along the primary manifold component 220 adjacent to the auxiliary manifold component 230 or at least about 7 compression valve regions 240 disposed along the primary manifold component 220 adjacent to the auxiliary manifold component 230 or at least about 8 compression valve regions 240 disposed along the primary manifold component 220 adjacent to the auxiliary manifold component 230 or at least about 9 compression valve regions 240 disposed along the primary manifold component 220 adjacent to the auxiliary manifold component 230 or even at least about compression valve regions 240 disposed along the primary manifold component 220 adjacent to the auxiliary manifold component 230. According to still other embodiments, the body 210 may have a compression valve regions 240 disposed along the primary manifold component 220 adjacent to the auxiliary manifold component 230.

According to particular embodiments, and as shown in FIG. 2, the compression valve region 240 may include a primary compression manifold valve. According to still other embodiments, and as shown in FIG. 2, a primary compression manifold valve may be disposed along the body 210 along the primary manifold component 220 adjacent to the auxiliary manifold component 230. According to still other embodiments, and as shown in FIG. 2, a primary compression manifold valve may be disposed along the body 210 adjacent the primary channel exit port 225. According to yet other embodiments, and as shown in FIG. 2, a primary compression manifold valve may be disposed along the body 210 such that when the compression valve region 240 is in a closed position, fluid flow through the body 210 is restricted from flowing past the auxiliary channel 232 and through at least a portion of the primary channel 222. According to still other embodiments, and as shown in FIG. 2, the primary compression manifold valve is disposed along the body 210 such that when the compression valve region 240 is in a closed position, fluid flow through the body 210 is restricted from flowing past the primary channel exit port 225.

According to still other embodiments, the primary channel 222 may have an average diameter $D_{PC}$ and a first axis along its length between the proximal end 212 of the body and the distal end 214 of the body 210. According to yet other embodiments, the auxiliary channel 232 may have an average diameter $D_{AC}$ and a second axis along its length. According to yet other embodiments, the compression valve region 240 may be disposed along the body 210 such that when the compression valve region 240 is in a closed position, the primary channel 222 and the auxiliary channel 232 intersect to form an elbow bend that is contained within a volume defined by a sphere, where the sphere has a diameter equal to the larger of $D_{PC}$ and $D_{AC}$ and where the sphere is centered at an intersection of the first axis and the second axis.

According to yet other embodiments, the compression valve region 240 may be disposed along the body 210 such that when the compression valve region 240 is in a closed position, the primary channel 222 and the auxiliary channel 232 intersect to form an elbow bend that has an obtuse angle. According to still other embodiments, compression valve region 240 may be disposed along the body 210 such that when the compression valve region 240 is in a closed position, the primary channel 222 and the auxiliary channel 232 intersect to form an elbow bend that is a right angle.

According to still other embodiments, the compression valve region 240 may be disposed along the body 210 such that when the compression valve region 240 is in a closed position, the primary channel 222 may be coterminous with the auxiliary channel 232. It will be appreciated that as used in reference to embodiments described herein, the primary channel 222 is coterminous with the auxiliary channel 232 if the primary channel 222 extends to a distance of no more than $0.5*D_{AC}$ beyond a distal edge 234 of the auxiliary channel 232. In still other embodiments, the primary channel 222 may extend to a distance of no more than $0.4*D_{AC}$ or no more than $0.3*D_{AC}$ or no more than $0.25*D_{AC}$ or no more than $0.2*D_{AC}$ or no more than $0.15*D_{AC}$ or no more than $0.1*D_{AC}$ or no more than $0.05*D_{AC}$, or no more than $0.01*D_{AC}$ beyond a distal edge 234 of the auxiliary channel 232. In a further embodiment, the primary channel 222 may terminate precisely at the distal edge 234 of the distal flow channel.

According to still other embodiments, the compression valve region 240 may be disposed along the body 210 such that when the compression valve region 240 is in a closed position, the body 210 has substantially no dead space. According to still other embodiments, the compression valve region 240 may be disposed along the body 210 such that when the compression valve region 240 is in a closed position, the body 210 has no dead space. According to still other embodiments, the compression valve region 240 may be disposed along the body 210 such that when the compression valve region 240 is in a closed position, the body 210 has substantially no stagnant fluid flow. According to still other embodiments, the compression valve region 240 may be disposed along the body 210 such that when the compression valve region 240 is in a closed position, the body 210 has no stagnant fluid flow.

Figure 3:
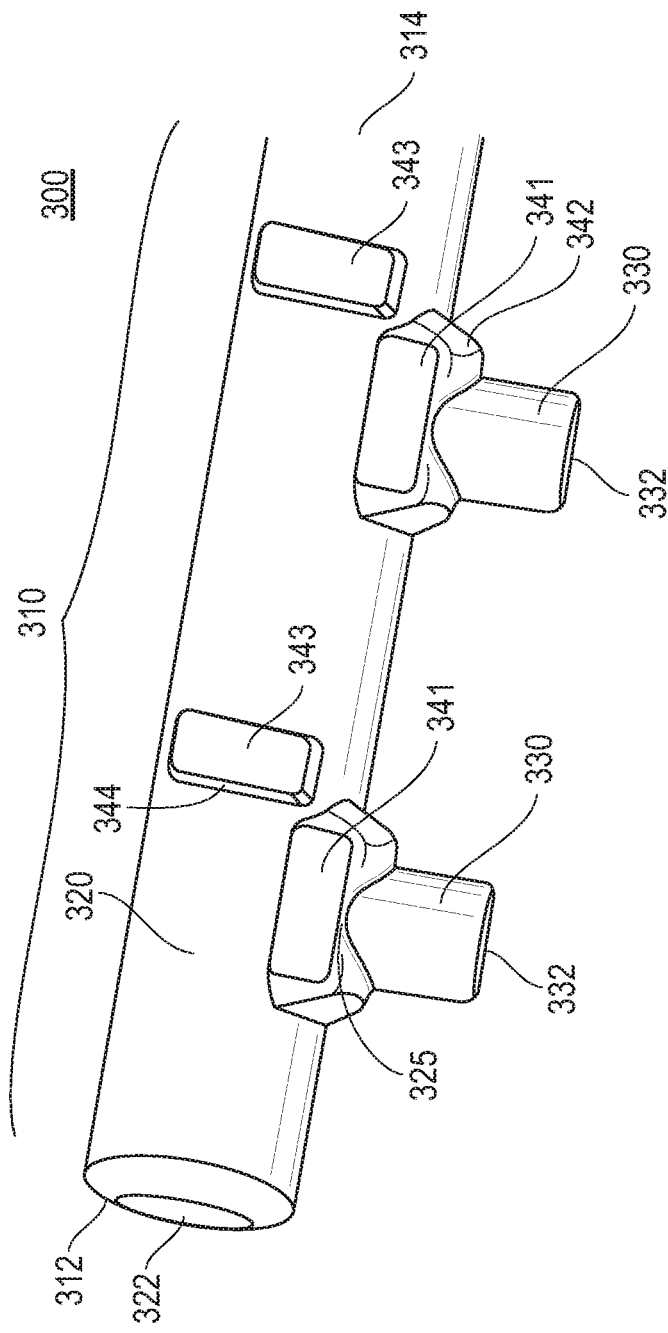
FIG. 3 includes an illustration of a perspective view of a fluid manifold according to certain embodiments descried herein.

FIG. 3 includes an illustration of a perspective view of a fluid manifold 300 according to other embodiments described herein. According to an embodiment and as shown in FIG. 3, the fluid manifold 300 may have a body 310 that may include a proximal end 312, a distal end 314 and a primary manifold component 320 extending from the proximal end 312 to the distal end 314. The primary manifold component 320 may enclose a primary channel 322. The body 310 may further include at least one auxiliary manifold component 330 diverging from the primary manifold component 320. The auxiliary manifold component 330 may enclose an auxiliary channel 332 connected to the primary channel 322. The body 310 may further include a first compression valve region 341 and a second compression valve region 343. The first compression valve region 341 may be disposed along body 310 between the primary manifold component 320 and the auxiliary manifold component 330. The second compression valve region 343 may be disposed along the primary manifold component 320 adjacent to the auxiliary manifold component 330. According to certain embodiments, the compression valve regions 341, 343 may be operable between an open position and a closed position.

According to particular embodiments, the body 310 may include any desirable number of auxiliary manifold components 330 diverging from the primary manifold component 320. According to certain embodiments, the body 310 may include a particular number of auxiliary manifold components 330 diverging from the primary manifold component 320. For example, the body 310 may include at least about 2 auxiliary manifold components 330 diverging from the primary manifold component 320, such as, at least about 3 auxiliary manifold components 330 diverging from the primary manifold component 320 or at least about 4 auxiliary manifold components 330 diverging from the primary manifold component 320 or at least about 5 auxiliary manifold components 330 diverging from the primary manifold component 320 or at least about 6 auxiliary manifold components 330 diverging from the primary manifold component 320 or at least about 7 auxiliary manifold components 330 diverging from the primary manifold component 320 or at least about 8 auxiliary manifold components 330 diverging from the primary manifold component 320 or at least about 9 auxiliary manifold components 330 diverging from the primary manifold component 320 or even at least about 10 auxiliary manifold components 330 diverging from the primary manifold component 320.

According to still other embodiments, the body 310 may include any desirable number of compression valve regions disposed between the primary manifold component 320 and an auxiliary manifold component 330. According to yet other embodiments, the body 310 may include a particular number of compression valve regions 341 disposed between the primary manifold component 320 and an auxiliary manifold component 330. For example, the body 310 may include at least about 2 compression valve regions 341 disposed between the primary manifold component 320 and an auxiliary manifold component 330, such as, at least about 3 compression valve regions 341 disposed between the primary manifold component 320 and an auxiliary manifold component 330 or at least about 4 compression valve regions 341 disposed between the primary manifold component 320 and an auxiliary manifold component 330 or at least about 5 compression valve regions 341 disposed between the primary manifold component 320 and an auxiliary manifold component 330 or at least about 6 compression valve regions 341 disposed between the primary manifold component 320 and an auxiliary manifold component 330 or at least about 7 compression valve regions 341 disposed between the primary manifold component 320 and an auxiliary manifold component 330 or at least about 8 compression valve regions 341 disposed between the primary manifold component 320 and an auxiliary manifold component 330 or at least about 9 compression valve regions 341 disposed between the primary manifold component 320 and an auxiliary manifold component 330 or even at least about 10 compression valve regions 341 disposed between the primary manifold component 320 and an auxiliary manifold component 330. According to still other embodiments, the body 310 may have a compression valve regions 341 disposed between the primary manifold component 320 and each auxiliary manifold component 330.

According to still other embodiments, the body 310 may include any desirable number of compression valve regions disposed along the primary manifold component 320 adjacent to the auxiliary manifold component 330. According to yet other embodiments, the body 310 may include a particular number of compression valve regions 343 disposed along the primary manifold component 320 adjacent to the auxiliary manifold component 330. For example, the body 310 may include at least about 2 compression valve regions disposed along the primary manifold component 320 adjacent to the auxiliary manifold component 330, such as, at least about 3 compression valve regions 343 disposed along the primary manifold component 320 adjacent to the auxiliary manifold component 330 or at least about 4 compression valve regions 343 disposed along the primary manifold component 320 adjacent to the auxiliary manifold component 330 or at least about 5 compression valve regions 343 disposed along the primary manifold component 320 adjacent to the auxiliary manifold component 330 or at least about 6 compression valve regions 343 disposed along the primary manifold component 320 adjacent to the auxiliary manifold component 330 or at least about 7 compression valve regions 343 disposed along the primary manifold component 320 adjacent to the auxiliary manifold component 330 or at least about 8 compression valve regions 343 disposed along the primary manifold component 320 adjacent to the auxiliary manifold component 330 or at least about 9 compression valve regions 343 disposed along the primary manifold component 320 adjacent to the auxiliary manifold component 330 or even at least about 10 compression valve regions 343 disposed along the primary manifold component 320 adjacent to the auxiliary manifold component 330. According to still other embodiments, the body 310 may have a compression valve regions 343 disposed along the primary manifold component 320 adjacent to the auxiliary manifold component 330.

According to particular embodiments, and as shown in FIG. 3, the compression valve region 341 may include a primary channel exit port valve. According to still other embodiments, and as shown in FIG. 3, a primary channel exit port valve may be disposed along the body 310 between the primary manifold component 320 and the auxiliary manifold component 330. According to still other embodiments, and as shown in FIG. 3, a primary channel exit port valve may be disposed along the body 310 at the primary channel exit port 325. According to yet other embodiments, and as shown in FIG. 3, a primary channel exit port valve may be disposed along the body 310 such that when the compression valve region 340 is in a closed position, fluid flow through the body 310 is restricted from flowing out of the primary channel 322 and into the auxiliary channel 332. According to still other embodiments, and as shown in FIG. 3, a primary channel exit port valve is disposed along the body 310 such that when the compression valve region 340 is in a closed position, fluid flow through the body 310 is restricted from flowing through the primary channel exit port 325.

According to particular embodiments, and as shown in FIG. 3, the compression valve region 343 may include a primary compression manifold valve. According to still other embodiments, and as shown in FIG. 3, a primary compression manifold valve may be disposed along the body 310 along the primary manifold component 320 adjacent to the auxiliary manifold component 330. According to still other embodiments, and as shown in FIG. 3, a primary compression manifold valve may be disposed along the body 310 adjacent the primary channel exit port 325. According to yet other embodiments, and as shown in FIG. 3, a primary compression manifold valve may be disposed along the body 310 such that when the compression valve region 340 is in a closed position, fluid flow through the body 310 is restricted from flowing past the auxiliary channel 332 and through at least a portion of the primary channel 322. According to still other embodiments, and as shown in FIG. 3, the primary compression manifold valve is disposed along the body 310 such that when the compression valve region 340 is in a closed position, fluid flow through the body 310 is restricted from flowing past the primary channel exit port 325.

According to still other embodiments, the compression valve region 341, 343, may be disposed along the body 310 such that when the compression valve region 341, 343, are in a closed position, the body 310 has substantially no dead space. According to still other embodiments, the compression valve region compression valve regions 341, 343, may be disposed along the body 310 such that when the compression valve region compression valve regions 341, 343, is in a closed position, the body 310 has no dead space. According to still other embodiments, the compression valve region compression valve regions 341, 343, may be disposed along the body 310 such that when the compression valve region compression valve regions 341, 343, is in a closed position, the body 310 has substantially no stagnant fluid flow. According to still other embodiments, the compression valve region compression valve regions 341, 343, may be disposed along the body 310 such that when the compression valve region compression valve regions 341, 343, is in a closed position, the body 310 has no stagnant fluid flow.

It will be appreciated that the compression valve region 341 may include or be described as having any of the characteristics of the compression valve region 140 described in reference to FIGS. 1a, 1b and 1c. It will be further appreciated that the compression valve region 343 may include or described as having any of the characteristics of the compression valve region 240 described in reference to FIG. 2.

According to still other embodiments, the compression valve regions 140, 240, 341, 343, may be configured to be in a closed position when placed under a particular asserted pressure. For example, the compression valve regions 140, 240, 341, 343, may be configured to be in a closed position when placed under an asserted pressure of not greater than about 20 N or not greater than about 19 N or not greater than about 18 N or not greater than about 17 N or not greater than about 16 N or not greater than about 15 N or not greater than about 14 N or not greater than about 13 N or not greater than about 12 N or not greater than about 11 N or not greater than about 10 N or not greater than about 9 N or not greater than about 8 N or not greater than about 7 N or not greater than about 6 N or not greater than about 5 N. According to still other embodiments, the compression valve regions 140, 240, 341, 343, may be configured to be in a closed position when placed under an asserted pressure of at least about 1 N, such as, at least about 1.5 N or even at least about 2.0 N. It will be appreciated that the compression valve regions 140, 240, 341, 343, may be configured to be in a closed position when placed under an asserted pressure within a range between any of the minimum and maximum values noted above. It will be further appreciated that the compression valve regions 140, 240, 341, 343, may be configured to be in a closed position when placed under an asserted pressure of any value between any of the minimum and maximum values noted above.

According to still other embodiments, the compression valve regions 140, 240, 341, 343, may have a particular average thickness $AT_{CVR}$ equal to the average thickness of an outer wall defining the compression valve regions 140, 240, 341, 343. According to yet other embodiments, the primary manifold component 120 may have a particular average thickness $AT_{PMC}$ equal to the average thickness of an outer wall defining the primary manifold component 120. According to yet other embodiments, the auxiliary manifold component 130 may have a particular average thickness $AT_{AMC}$ equal to the average thickness of an outer wall defining the auxiliary manifold component 130.

According to yet other embodiments, the average thickness $AT_{CVR}$ of the compression valve regions 140, 240, 341, 343, may be different from the average thickness $AT_{PMC}$ of the primary manifold component 120. According to yet other embodiments, the average thickness of the compression valve region $AT_{CVR}$ may be not greater than 0.9 $AT_{PMC}$, such as, not greater than 0.8 $AT_{PMC}$ or not greater than 0.7 $AT_{PMC}$ or not greater than 0.6 $AT_{PMC}$ or not greater than 0.5 $AT_{PMC}$ or not greater than 0.4 $AT_{PMC}$ or not greater than 0.3 $AT_{PMC}$ or even not greater than 0.2 $AT_{PMC}$. According to still other embodiments, the average thickness of the compression valve region $AT_{CVR}$ may at least about 0.01 $AT_{PMC}$, such as, at least about 0.05 $AT_{PMC}$ or even at least about 0.1 $AT_{PMC}$.

According to yet other embodiments, the average thickness $AT_{CVR}$ of the compression valve regions 140, 240, 341, 343, may be different from the average thickness $AT_{AMC}$ of the auxiliary manifold component 130. According to yet other embodiments, the average thickness of the compression valve region $AT_{CVR}$ may be not greater than 0.9 $AT_{AMC}$, such as, not greater than 0.8 $AT_{AMC}$ or not greater than 0.7 $AT_{AMC}$ or not greater than 0.6 $AT_{AMC}$ or not greater than 0.5 $AT_{AMC}$ or not greater than 0.4 $AT_{AMC}$ or not greater than 0.3 $AT_{AMC}$ or even not greater than 0.2 $AT_{AMC}$. According to still other embodiments, the average thickness of the compression valve region $AT_{AVR}$ may at least about 0.01 $AT_{AMC}$, such as, at least about 0.05 $AT_{AMC}$ or even at least about 0.1 $AT_{AMC}$.

According to still other embodiments, the compression valve regions 140, 240, 341, 343, may have a particular average tensile strength $TS_{CVR}$ equal to the average tensile strength of an outer wall defining the compression valve regions 140, 240, 341, 343. According to yet other embodiments, the primary manifold component 120 may have a particular average tensile strength $TS_{PMC}$ equal to the average tensile strength of an outer wall defining the primary manifold component 120. According to yet other embodiments, the auxiliary manifold component 130 may have a particular average tensile strength $TS_{AMC}$ equal to the average tensile strength of an outer wall defining the auxiliary manifold component 130.

According to yet other embodiments, the average tensile strength $TS_{CVR}$ of the compression valve regions 140, 240, 341, 343, may be different from the average tensile strength $TS_{PMC}$ of the primary manifold component 120. According to yet other embodiments, the average tensile strength of the compression valve region $TS_{CVR}$ may be not greater than 0.9 $TS_{PMC}$, such as, not greater than 0.8 $TS_{PMC}$ or not greater than 0.7 $TS_{PMC}$ or not greater than 0.6 $TS_{PMC}$ or not greater than 0.5 $TS_{PMC}$ or not greater than 0.4 $TS_{PMC}$ or not greater than 0.3 $TS_{PMC}$ or even not greater than 0.2 $TS_{PMC}$. According to still other embodiments, the average tensile strength of the compression valve region $TS_{CVR}$ may at least about 0.01 $TS_{PMC}$, such as, at least about 0.05 $TS_{PMC}$ or even at least about 0.1 $TS_{PMC}$.

According to yet other embodiments, the average tensile strength $TS_{CVR}$ of the compression valve regions 140, 240, 341, 343, may be different from the average tensile strength $TS_{AMC}$ of the auxiliary manifold component 130. According to yet other embodiments, the average tensile strength of the compression valve region $TS_{CVR}$ may be not greater than 0.9 $TS_{AMC}$, such as, not greater than 0.8 $TS_{AMC}$ or not greater than 0.7 $TS_{AMC}$ or not greater than 0.6 $TS_{AMC}$ or not greater than 0.5 $TS_{AMC}$ or not greater than 0.4 $TS_{AMC}$ or not greater than 0.3 $TS_{AMC}$ or even not greater than 0.2 $TS_{AMC}$. According to still other embodiments, the average tensile strength of the compression valve region $TS_{CVR}$ may at least about 0.01 $TS_{AMC}$, such as, at least about 0.05 $TS_{AMC}$ or even at least about 0.1 $TS_{AMC}$.

According to still other embodiments, the compression valve regions 140, 240, 341, 343, may have a particular average density $DN_{CVR}$ equal to the average density of an outer wall defining the compression valve regions 140, 240, 341, 343. According to yet other embodiments, the primary manifold component 120 may have a particular average density $DN_{PMC}$ equal to the average density of an outer wall defining the primary manifold component 120. According to yet other embodiments, the auxiliary manifold component 130 may have a particular average density $DN_{AMC}$ equal to the average density of an outer wall defining the auxiliary manifold component 130.

According to yet other embodiments, the average density $DN_{CVR}$ of the compression valve regions 140, 240, 341, 343, may be different from the average density $DN_{PMC}$ of the primary manifold component 120. According to yet other embodiments, the average density of the compression valve region $DN_{CVR}$ may be not greater than 0.9 $DN_{PMC}$, such as, not greater than 0.8 $DN_{PMC}$ or not greater than 0.7 $DN_{PMC}$ or not greater than 0.6 $DN_{PMC}$ or not greater than 0.5 $DN_{PMC}$ or not greater than 0.4 $DN_{PMC}$ or not greater than 0.3 $DN_{PMC}$ or even not greater than 0.2 $DN_{PMC}$. According to still other embodiments, the average density of the compression valve region $DN_{CVR}$ may at least about 0.01 $DN_{PMC}$, such as, at least about 0.05 $DN_{PMC}$ or even at least about 0.1 $DN_{PMC}$.

According to yet other embodiments, the average density $DN_{CVR}$ of the compression valve regions 140, 240, 341, 343, may be different from the average density $DN_{AMC}$ of the auxiliary manifold component 130. According to yet other embodiments, the average density of the compression valve region $DN_{CVR}$ may be not greater than 0.9 $DN_{AMC}$, such as, not greater than 0.8 $DN_{AMC}$ or not greater than 0.7 $DN_{AMC}$ or not greater than 0.6 $DN_{AMC}$ or not greater than 0.5 $DN_{AMC}$ or not greater than 0.4 $DN_{AMC}$ or not greater than 0.3 $DN_{AMC}$ or even not greater than 0.2 $DN_{AMC}$. According to still other embodiments, the average density of the compression valve region $DN_{AVR}$ may at least about 0.01 $DN_{AMC}$, such as, at least about 0.05 $DN_{AMC}$ or even at least about 0.1 $DN_{AMC}$.

According to still other embodiments, the primary manifold component 120 and the compression valve regions 140, 240, 341, 343, may have distinct shapes. According to still other embodiments, the auxiliary manifold component 130 and the compression valve regions 140, 240, 341, 343, may have distinct shapes.

According to yet other embodiments, the compression valve regions 140, 240, 341, 343, may include an impression extending into the primary manifold component. According to still other embodiments, the compression valve regions 140, 240, 341, 343, may include a protuberance 141, 241, 342, 344 protruding out of the primary manifold component.

According to still other embodiments, the primary channel 122, 222, 322, may be rectilinear. According to still other embodiments, the primary channel 122, 222, 322, may have an average inner diameter $D_{PC}$. According to yet other embodiments, each of the auxiliary channels 132, 232, 332 may be rectilinear. According to yet other embodiments, each of the auxiliary channels 132, 232, 332 may have an average inner diameter $D_{AC}$. According to still other embodiments, the primary channel 122, 222, 322, may have an inner diameter $D_{PC}$ that is larger than the inner diameter of each of the auxiliary channels $D_{AC}$. According to yet other embodiments, the primary channel 122, 222, 322, may have an inner diameter $D_{PC}$ that is equal to the inner diameter $D_{AC}$ of each of the auxiliary channels 132, 232, 332.

According to still other embodiments, the fluid manifold 100, 200, 300 may have a particular channel diameter ratio $D_{PC}/D_{AC}$. For example, the fluid manifold 100, 200, 300 may have a channel diameter ratio $D_{PC}/D_{AC}$ of at least 0.01, such as, at least 0.05 or at least 0.1 or at least 0.2 or at least 0.3 or at least 0.4 or at least 0.5 or at least 0.6 or at least 0.7 or at least 0.8 or even at least 0.9. According to still other embodiments, the fluid manifold 100, 200, 300 may have a channel diameter ratio $D_{PC}/D_{AC}$ of not greater than 0.99, such as, not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or even not greater than 0.05. It will be appreciated that the fluid manifold 100, 200, 300, may have a particular channel diameter ratio $D_{PC}/D_{AC}$ within a range between any of the values noted above. It will be further appreciated that the fluid manifold 100, 200, 300, may have a particular channel diameter ratio $D_{PC}/D_{AC}$ of any value between any of the values noted above.

According to still other embodiments, the primary channel 122, 222, 322, may have a particular average diameter $D_{DC}$. For example, the primary channel 122, 222, 322, may have an average diameter $D_{DC}$ of at least 1 mm, such as, at least 2 mm or at least 5 mm or at least 10 mm or at least 15 mm or at least 20 mm or at least 25 mm or at least 10 mm or at least 15 mm or at least 20 mm or at least 25 mm or at least 30 mm or at least 35 mm or at least 40 mm or at least 45 mm or at least 70 mm or at least 75 mm or at least 80 mm or at least 85 mm or at least 90 mm or even at least 95 mm. According to yet other embodiments, the primary channel 122, 222, 322, may have an average diameter $D_{DC}$ of not greater than 100 mm, such as, or not greater than 95 mm or not greater than 90 mm or not greater than 85 mm or not greater than 80 mm or not greater than 75 mm or not greater than 70 mm or not greater than 65 mm or not greater than 60 mm or not greater than 55 mm or not greater than 50 mm or not greater than 45 mm or not greater than 40 mm or not greater than 35 mm or not greater than 30 mm or not greater than 25 mm or not greater than 20 mm or not greater than 15 mm or not greater than 10 mm or not greater than 5 mm or even not greater than 2 mm. It will be appreciated that the primary channel 122, 222, 322, may have an average diameter $D_{DC}$ within a range between any of the values noted above. It will be further appreciated that the primary channel 122, 222, 322, may have an average diameter $D_{DC}$ of any value between any of the values noted above.

According to still other embodiments, the auxiliary channel 132, 232, 332, may have a particular average diameter $D_{AC}$. For example, the auxiliary channel 132, 232, 332, may have an average diameter $D_{AC}$ of at least 1 mm, such as, at least 2 mm or at least 3 mm or at least 10 mm or at least 15 mm or at least 20 mm or at least 25 mm or at least 10 mm or at least 15 mm or at least 20 mm or at least 25 mm or at least 30 mm or at least 35 mm or at least 40 mm or at least 45 mm or at least 70 mm or at least 75 mm or at least 80 mm or at least 85 mm or at least 90 mm or even at least 95 mm. According to yet other embodiments, the auxiliary channel 132, 232, 332, may have an average diameter $D_{AC}$ of not greater than 100 mm, such as, or not greater than 95 mm or not greater than 90 mm or not greater than 85 mm or not greater than 80 mm or not greater than 75 mm or not greater than 70 mm or not greater than 65 mm or not greater than 60 mm or not greater than 55 mm or not greater than 50 mm or not greater than 45 mm or not greater than 40 mm or not greater than 35 mm or not greater than 30 mm or not greater than 25 mm or not greater than 20 mm or not greater than 15 mm or not greater than 10 mm or not greater than 5 mm or even not greater than 2 mm. It will be appreciated that the auxiliary channel 132, 232, 332, may have an average diameter $D_{AC}$ within a range between any of the values noted above. It will be further appreciated that the auxiliary channel 132, 232, 332, may have an average diameter $D_{AC}$ of any value between any of the values noted above.

According to yet other embodiments, the primary channel 122, 222, 322, may have a circular cross-section. According to still other embodiments, the primary channel 122, 222, 322, may have a non-circular cross-section. According to yet other embodiments, the auxiliary channel 132, 232, 332, may have a circular cross-section. According to still other embodiments, the auxiliary channel 132, 232, 332, may have a non-circular cross-section.

According to other embodiments, the fluid manifold 100, 200, 300, may include a particular material. For example, the fluid manifold 100, 200, 300, may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the fluid manifold 100, 200, 300, may consist essentially of a particular material. For example, the fluid manifold 100, 200, 300, may consist essentially of silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the primary manifold component 120, 220, 320, may include a particular material. For example, the primary manifold component 120, 220, 320, may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the primary manifold component 120, 220, 320, may consist essentially of a particular material. For example, the primary manifold component 120, 220, 320, may consist essentially of silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the auxiliary manifold component 130, 230, 330, may include a particular material. For example, the auxiliary manifold component 130, 230, 330, may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the auxiliary manifold component 130, 230, 330, may consist essentially of a particular material. For example, the auxiliary manifold component 130, 230, 330, may consist essentially of silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the compression valve regions 140, 240, 341, 343, may include a particular material. For example, the compression valve regions 140, 240, 341, 343, may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the compression valve regions 140, 240, 341, 343, may consist essentially of a particular material. For example, the compression valve regions 140, 240, 341, 343, may consist essentially of silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to other embodiments, the fluid manifold 100, 200, 300, may include an embedded reinforcement material. According to still other embodiments, the embedded reinforcement material may include polyester, adhesion modified polyester, polyamide, polyaramid, stainless steel or any combination thereof. According to still other embodiments, the embedded reinforcement material may consist essentially of polyester, adhesion modified polyester, polyamide, polyaramid, stainless steel or any combination thereof. According to still other embodiments, the embedded reinforcement material may include wire or strands. According to still other embodiments, the embedded reinforcement material may include braided wire or braided strands.

According to other embodiments, the fluid manifold 100, 200, 300, may be encased by a reinforcement shell 402. According to still other embodiments, the reinforcement shell 402 may include a polymer material. According to still other embodiments, the reinforcement shell 402 may consist essentially of a polymer material. According to still other embodiments, the reinforcement shell 402 may include a thermoplastic material. According to still other embodiments, the reinforcement shell 402 may consist essentially of a thermoplastic material. According to still other embodiments, the reinforcement shell 402 may include polypropylene. According to still other embodiments, the reinforcement shell 402 may consist essentially of polypropylene.

Figure 4:
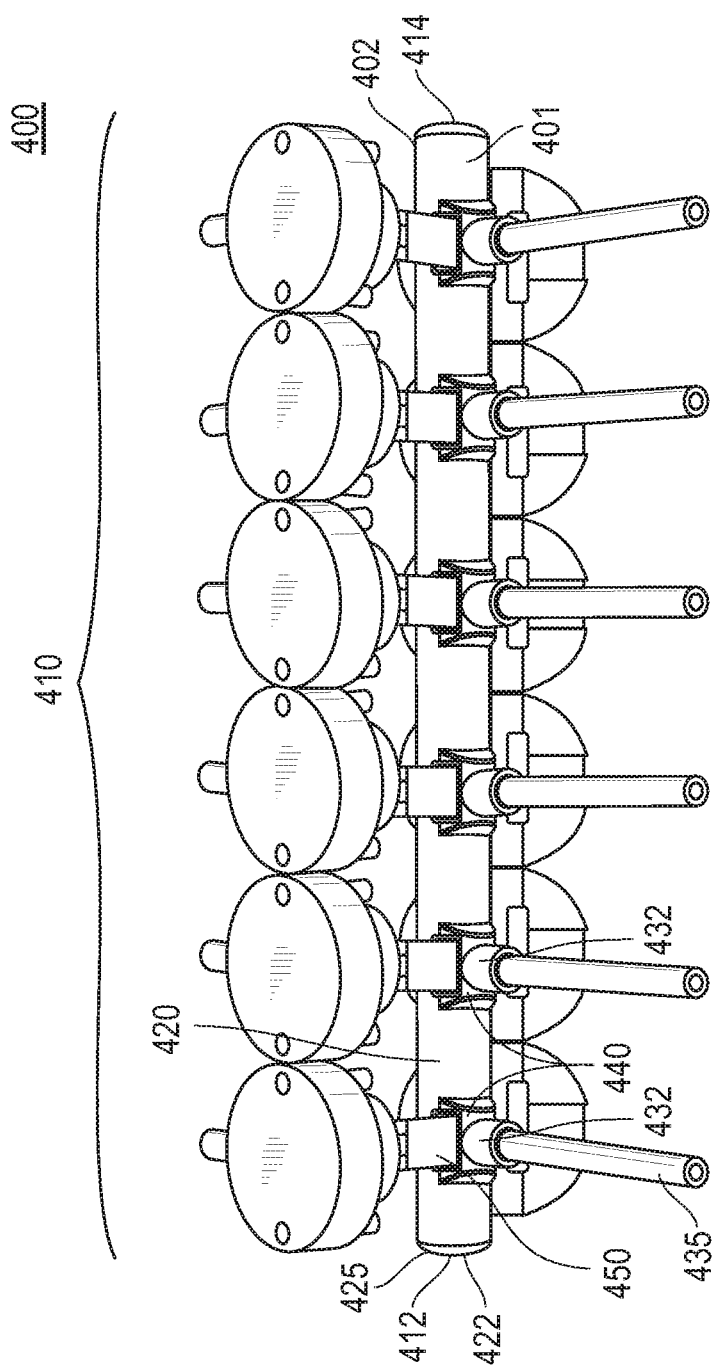
FIG. 4 includes an illustration of a perspective view of a fluid manifold assembly according to certain embodiments described herein.

FIG. 4 includes an illustration of a perspective view of a fluid manifold assembly 400 according to certain embodiments described herein. According to an embodiment and as shown in FIG. 4, the fluid manifold assembly 400 may include a fluid manifold 401 (300, 200, 300) and at least one clamping component 450.

It will be appreciated that the fluid manifold 401 may include any of the components and characteristics described in reference to the fluid manifolds of FIG. 1a, 2, or 3 (i.e., fluid manifolds 100, 200, 300). For purposes of illustration, the fluid manifold 401 may include a body 110 that may include a proximal end 412, a distal end 414 and a primary manifold component 420 extending from the proximal end 412 to the distal end 414. The primary manifold component 420 may enclose a primary channel 422. The body 410 may further include at least one auxiliary manifold component 430 diverging from the primary manifold component 420. The auxiliary manifold component 430 may enclose an auxiliary channel 432 connected to the primary channel 422. The body 410 may further include at least one compression valve region 440 disposed between the primary manifold component 420 and the auxiliary manifold component 430. According to certain embodiments, the compression valve region 440 may be operable between an open position and a closed position.

According to particular embodiments, the clamping component 450 may be disposed at each of the at least one compression valve regions 440. According to still other embodiments, the clamping component 450 may be configured to apply sufficient pressure to the compression valve region 440 such that the compression valve region 440 is placed in a closed position.

According to yet other embodiments, the fluid manifold assembly 400 may further include a primary tube 425 overmolded by at least a portion of the primary manifold component 420. According to certain embodiments, the primary tube 425 may be overmolded at the proximal end of the body 410. According to yet other embodiments, the primary tube 425 may be overmolded to the primary channel 422 of the primary manifold component 420.

According to still other embodiments, the fluid manifold assembly 400 may further include an auxiliary tube 435 overmolded by at least a portion of the at least one auxiliary manifold component 430. According to yet other embodiments, the auxiliary tube 435 may be overmolded to the auxiliary channel 432 of the auxiliary manifold component 430. According to still other embodiments, the fluid manifold assembly 400 may further include a separate auxiliary tube 435 associated with any one of or each of the auxiliary manifold components 430. According to particular embodiments, each of the auxiliary tubes 435 may be overmolded by at least a portion of the corresponding auxiliary manifold components 430. According to yet other embodiments, each of the auxiliary tubes 435 may be overmolded to the auxiliary channel 432 of the corresponding auxiliary manifold components 430.

According to particular embodiments, the primary tube 425 may have an inner diameter that corresponds or is equal to an inner diameter of the primary channel 422 at the opening adjacent the tube.

According to yet other embodiments, the auxiliary tubes 435 may have an inner diameter that correspond or is equal to an inner diameter of the corresponding auxiliary channels 432 at the opening adjacent to the tubes.

According to still other embodiments, the primary tube 425 may include a polymer material. According to yet other embodiments, primary tube 425 may include a thermoplastic, a thermoset, an elastomer, a thermoplastic elastomer, an engineering thermoplastic elastomer or any combination thereof. According to other embodiments, primary tube 425 may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane, polydimethylsiloxane (PDMS), polypropylene, poly[vinylidene fluoride] (PVDF) or any combination thereof.

According to still other embodiments, the primary tube 425 may consist essentially of a polymer material. According to yet other embodiments, primary tube 425 may consist essentially of a thermoplastic, a thermoset, an elastomer, a thermoplastic elastomer, an engineering thermoplastic elastomer or any combination thereof. According to other embodiments, primary tube 425 may consist essentially of silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to still other embodiments, the auxiliary tubes 435 may include a polymer material. According to yet other embodiments, the auxiliary tubes 435 may include a thermoplastic, a thermoset, an elastomer, a thermoplastic elastomer, an engineering thermoplastic elastomer or any combination thereof. According to other embodiments, the auxiliary tubes 435 may include silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

According to still other embodiments, the auxiliary tubes 435 may consist essentially of a polymer material. According to yet other embodiments, the auxiliary tubes 435 may consist essentially of a thermoplastic, a thermoset, an elastomer, a thermoplastic elastomer, an engineering thermoplastic elastomer or any combination thereof. According to other embodiments, the auxiliary tubes 435 may consist essentially of silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, poly[vinylidene fluoride] (PVDF) or any combination thereof.

Figure 5A:
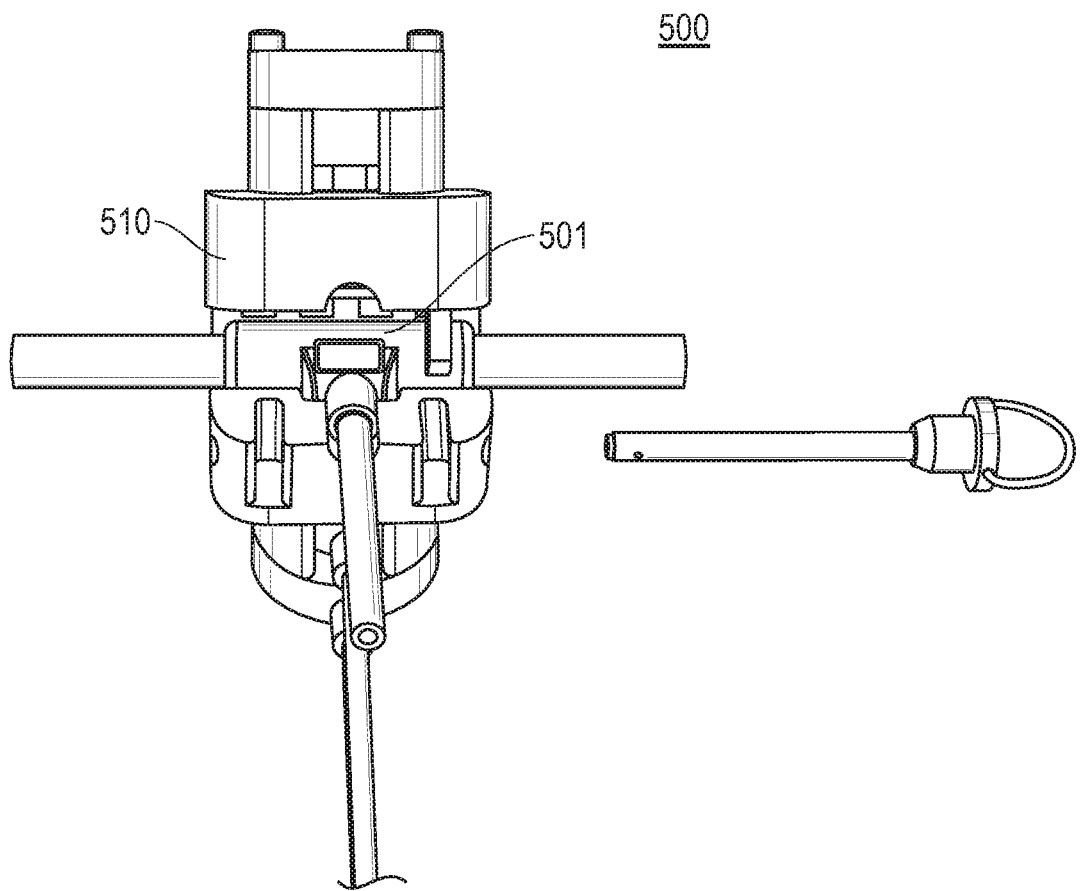
FIGS. 5a-5h include illustrations of perspective views of an example clamping apparatus for a fluid manifold assembly according to certain embodiments described herein.
Figure 5B:
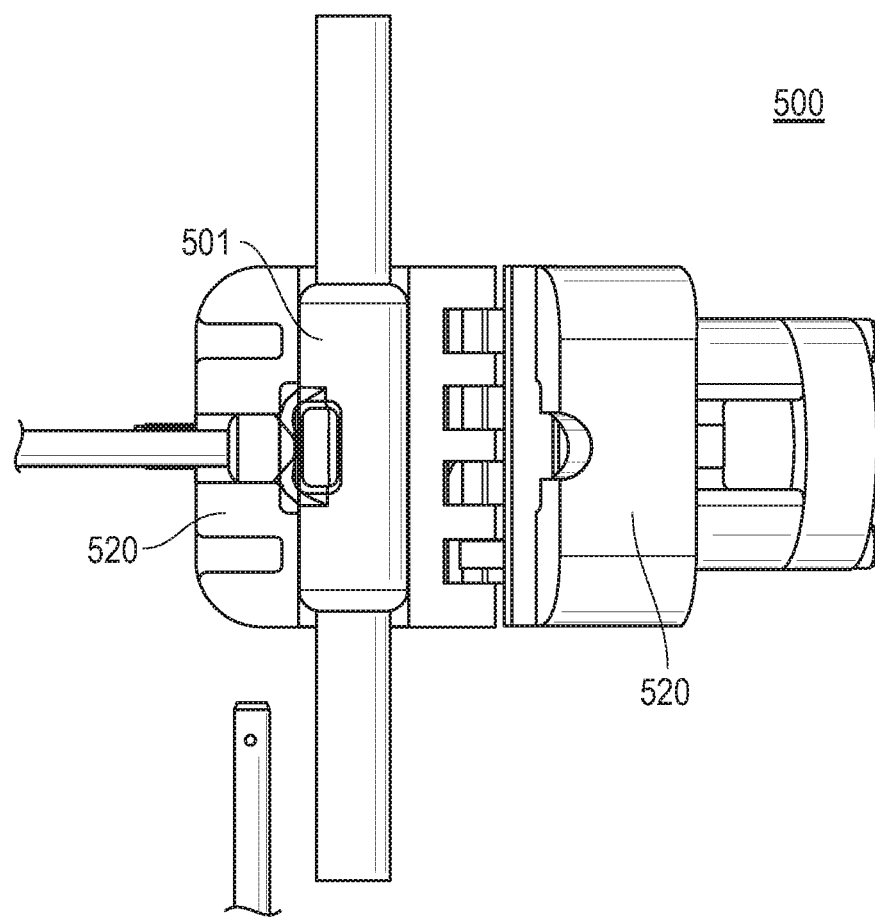
Figure 5C:
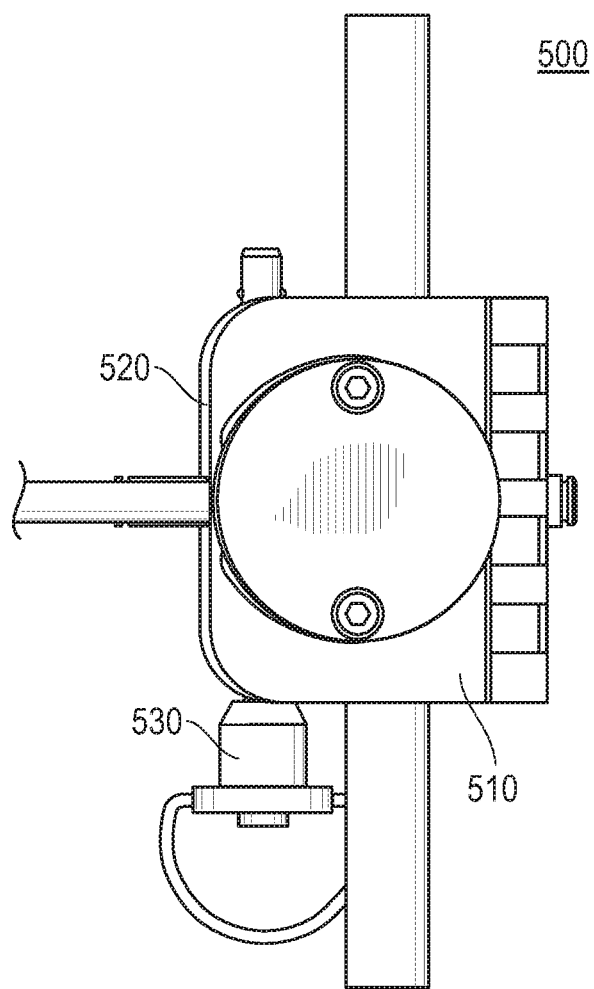
Figure 5D:
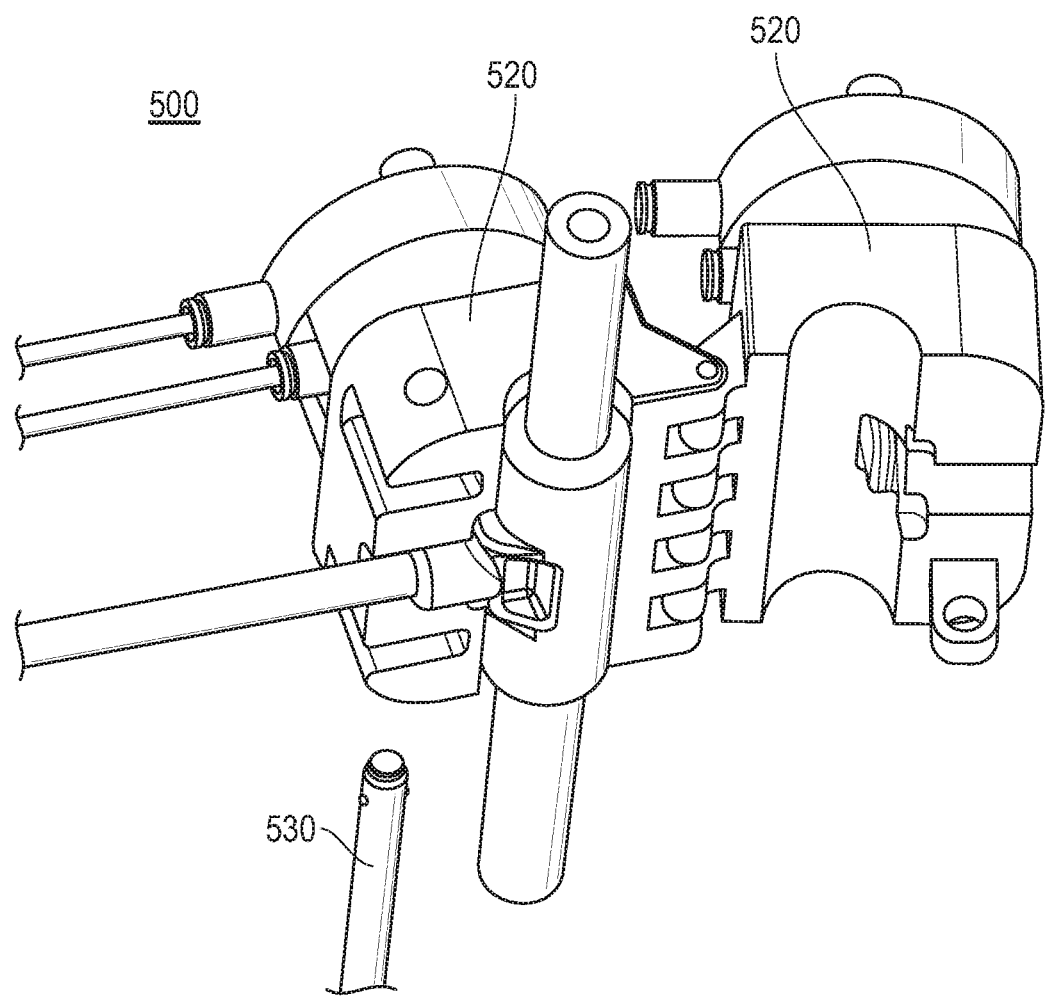
Figure 5E:
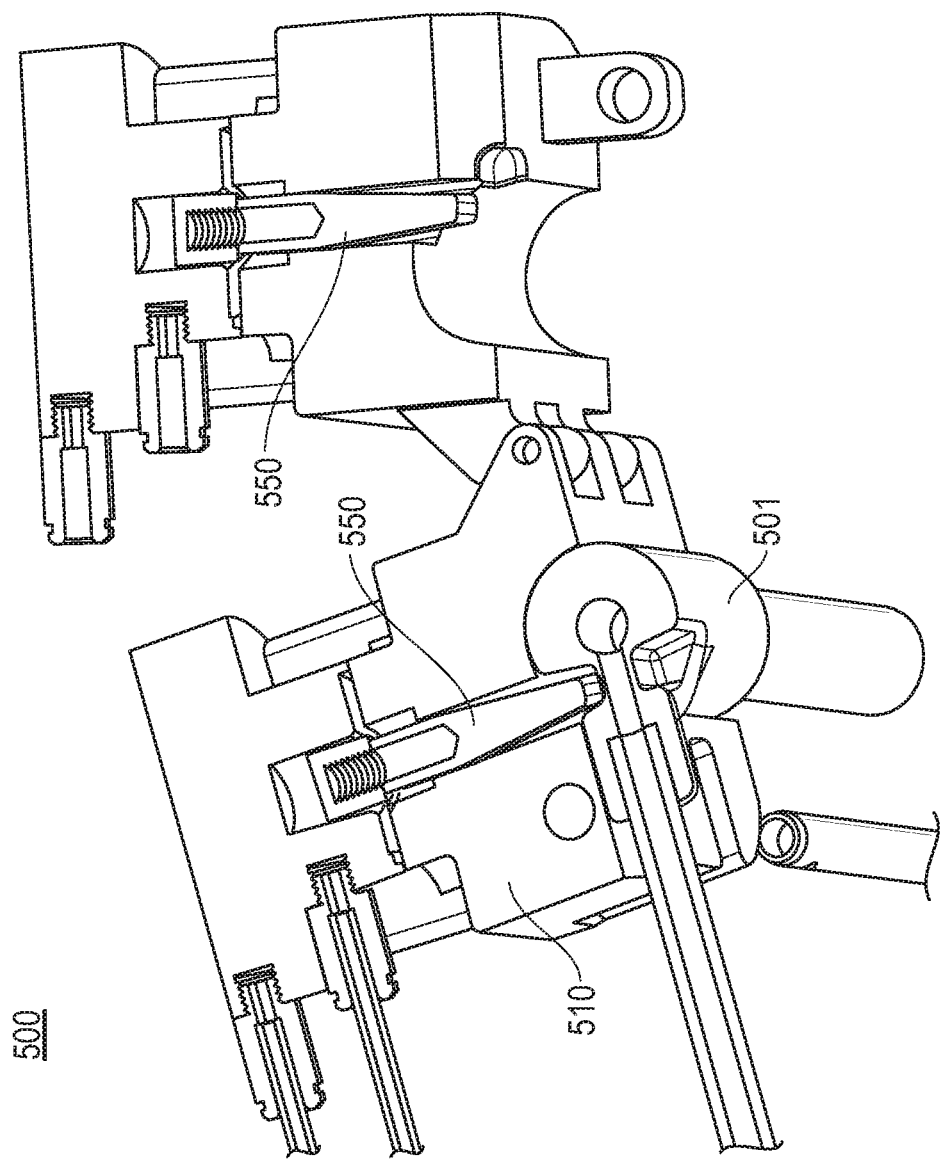
Figure 5F:
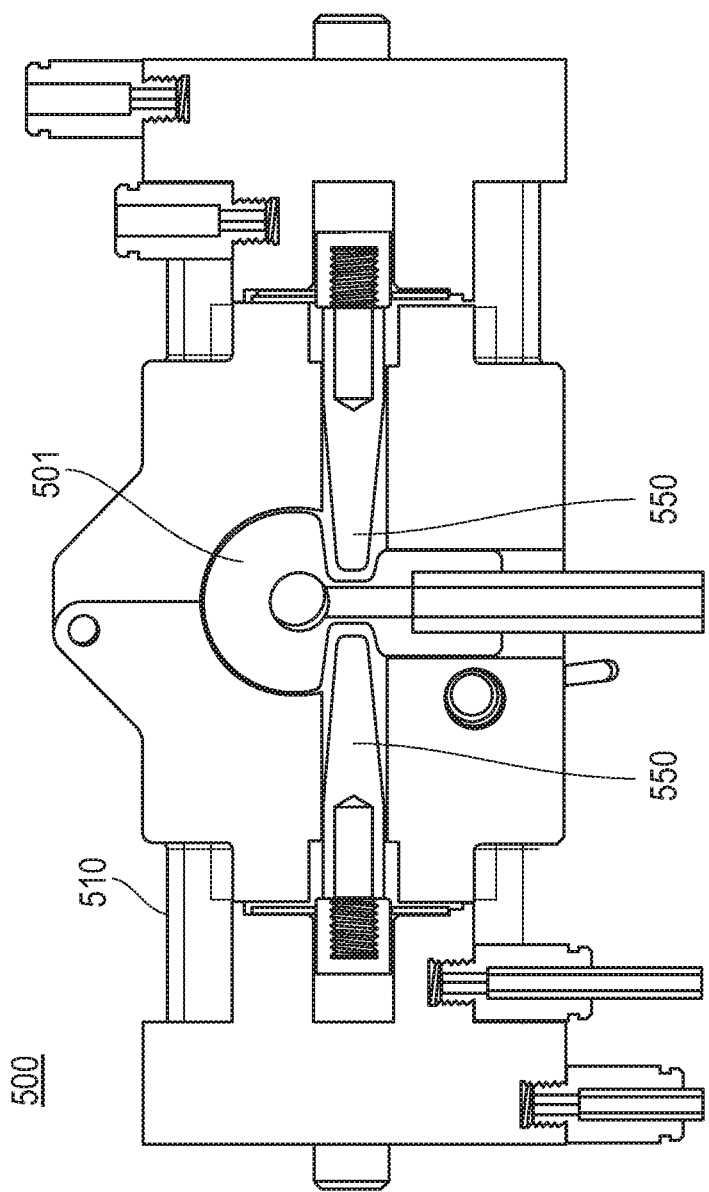
Figure 5G:
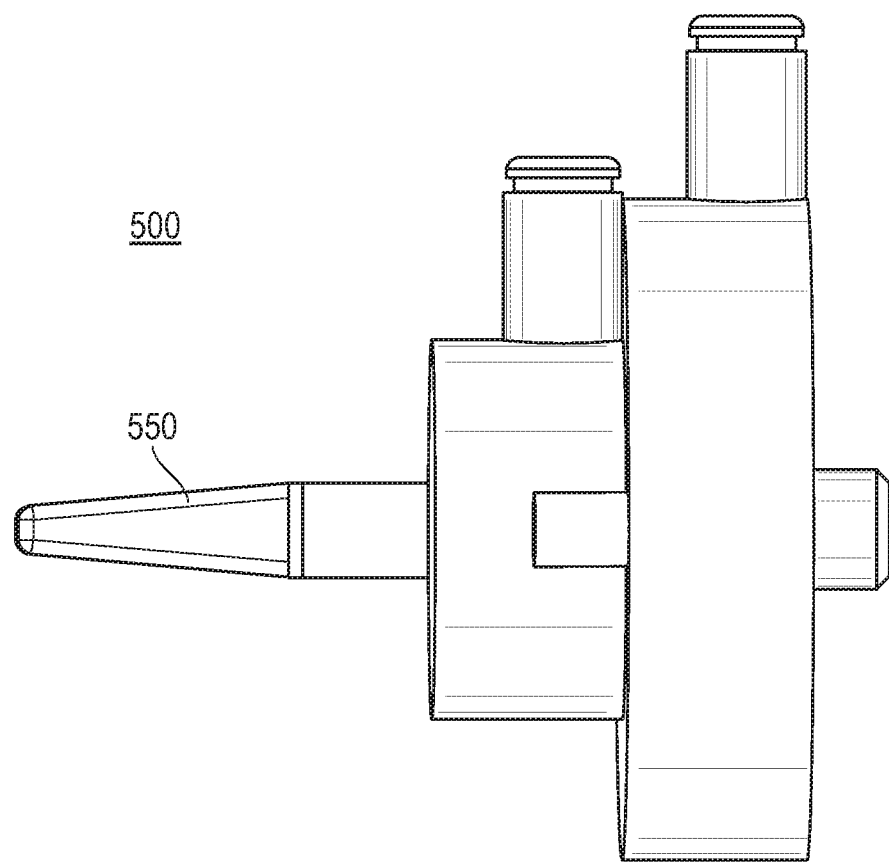
Figure 5H:
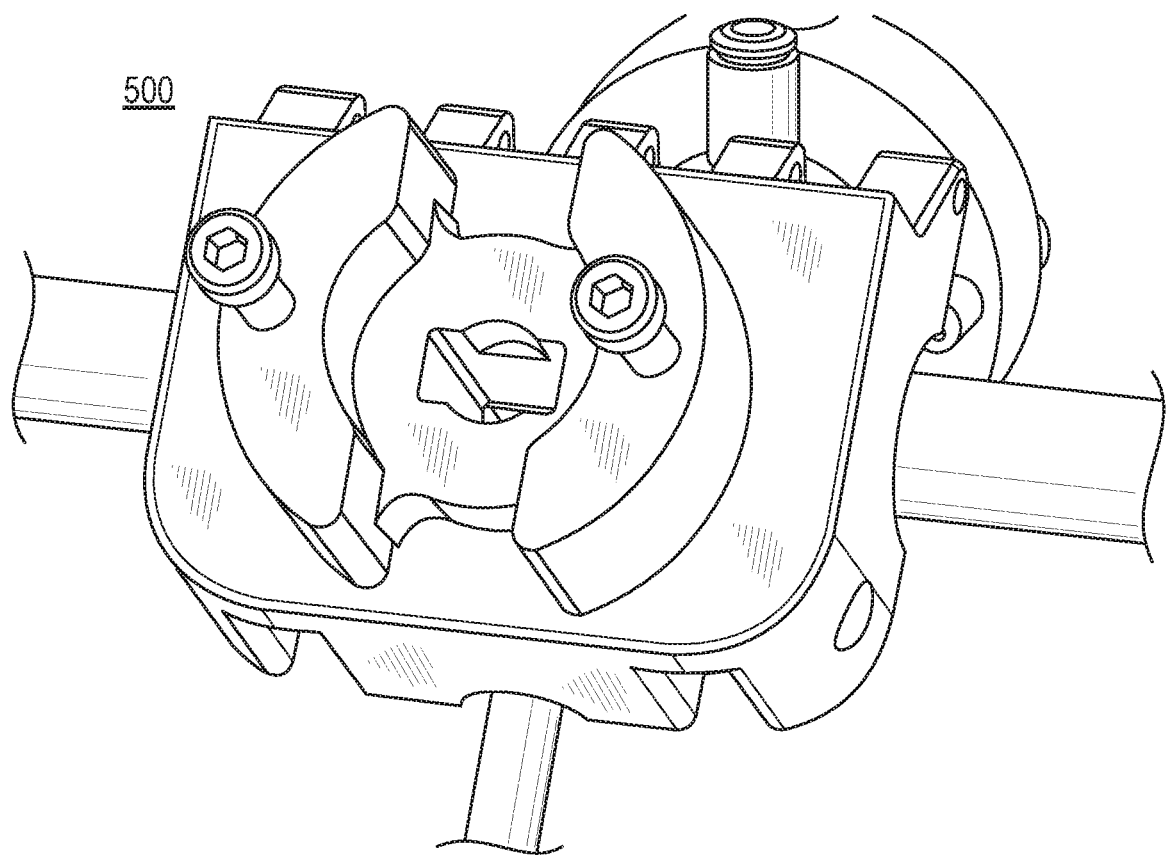

According to other embodiments, the clamping component may include a cylinder encasing the clamping component and configured to hold the fluid manifold. FIG. 5a includes an illustration, according to a certain embodiment, of a perspective view of a clamping apparatus 500 that includes a cylinder case 510 with a fluid manifold 501 seated within the clamping apparatus 500. FIG. 5b includes an illustration, according to another embodiment, of a perspective view of the clamping apparatus 500 showing hinged doors 520 for loading and encasing the fluid manifold 501. FIG. 5c includes an illustration, according to another embodiment, of a perspective view of the clamping apparatus 500 showing a ball detent pin 530 inserted into the cylinder case 510 for securing the hinged doors 520 of the clamping apparatus 500. FIG. 5d includes an illustration, according to another embodiment, of a perspective view of the clamping apparatus 500 showing a ball detent pin 530 for securing the hinged doors 520 of the clamping apparatus 500. FIG. 5e includes an illustration, according to another embodiment, of a perspective view of the cross-section of a clamping apparatus 500 that includes a cylinder case 510 in an open configuration with a fluid manifold 501 seated within the clamping apparatus 500 and showing the clamping components 550. FIG. 5*f* includes an illustration, according to another embodiment, of a perspective view of the cross-section of a clamping apparatus 500 that includes a cylinder case 510 in a closed configuration with a fluid manifold 501 seated within the clamping apparatus 500 and showing the clamping components 550. FIG. 5*g* includes an illustration, according to another embodiment, of a perspective view of a portion of the clamping apparatus 500 holding the clamping component 550. FIG. 5*h* includes an illustration, according to another embodiment, of a perspective view of a portion of the clamping apparatus 500 with an opening for holding the clamping component 550. The clamping apparatus 500 may be actuated to actuate clamping components 550 through actuation means such as electrical, mechanical, hydraulic, and pneumatic means. Non-limiting examples of these actuation means may include cylinders, levers, and gearing.

Figure 6:
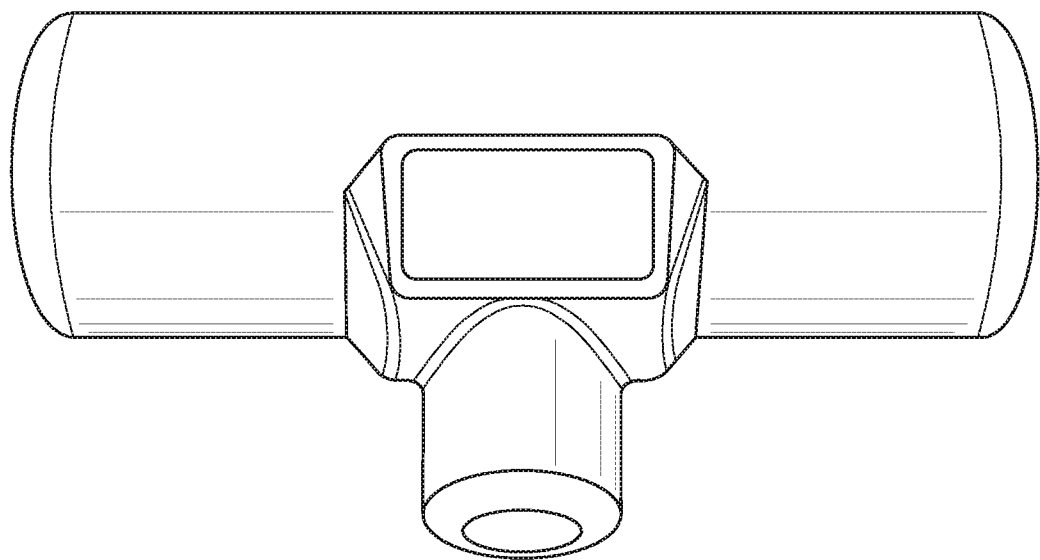
FIG. 6 includes an illustration of a perspective view of a fluid manifold according to certain embodiments descried herein.
Figure 7:
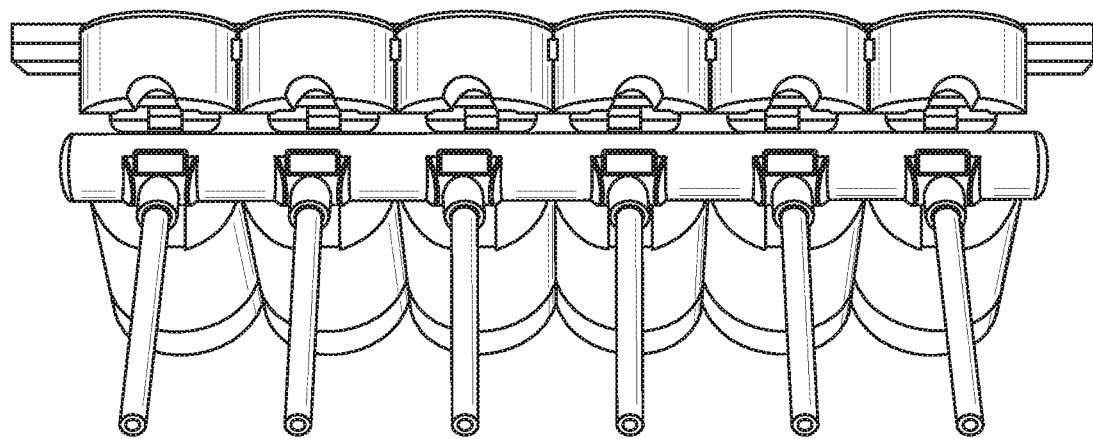
FIGS. 7-10 include illustrations of perspective view of perspective views of various examples of fluid manifold assemblies according to certain embodiments described herein.
Figure 8:
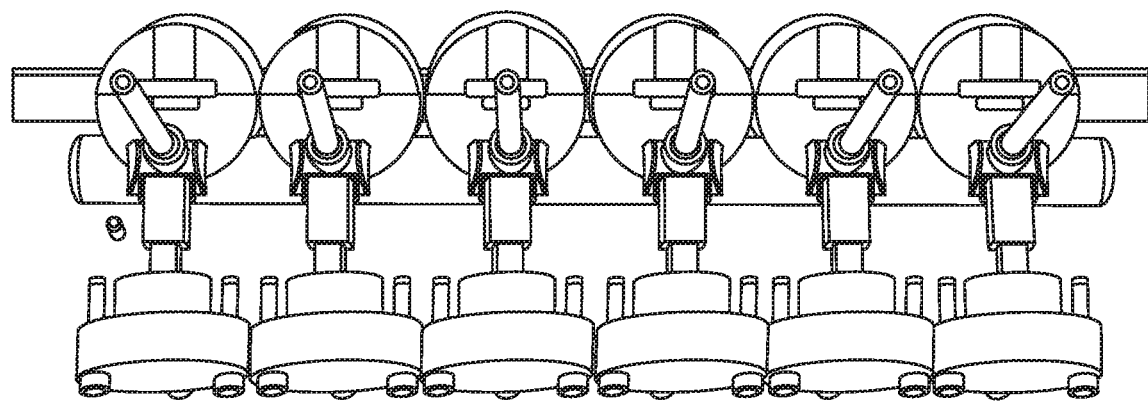
Figure 9:
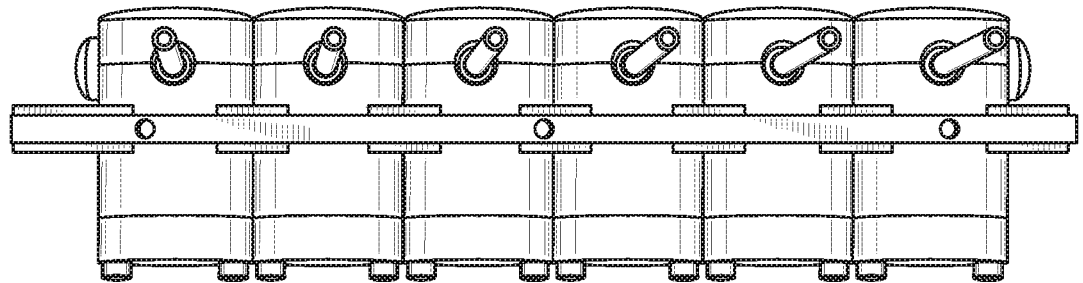
Figure 10:
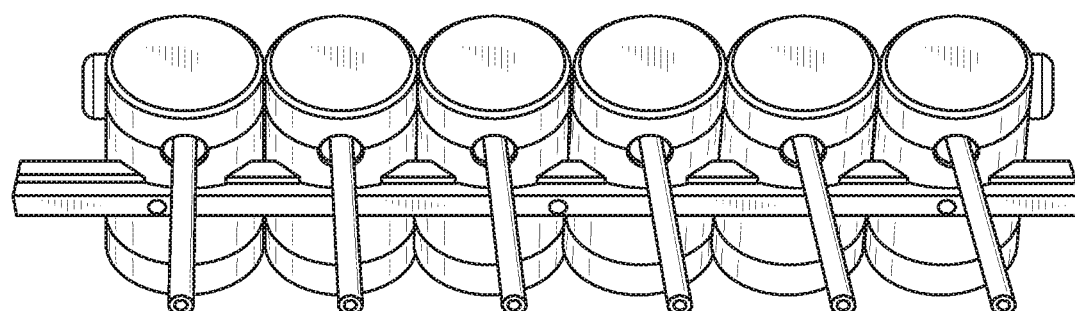

FIG. 6 includes an illustration of a perspective view of a fluid manifold according to certain embodiments descried herein. FIGS. 7-10 include illustrations of perspective view of perspective views of various examples of fluid manifold assemblies according to certain embodiments described herein.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A fluid manifold comprising a body, wherein the body comprises: a proximal end; a distal end; a primary manifold component extending from the proximal end of the body to the distal end of the body and enclosing a primary channel; at least one auxiliary manifold component diverging from the primary manifold component and enclosing an auxiliary channel connected to the primary channel at a primary channel exit port; and at least one compression valve region disposed along the body that is operable between an open position and a closed position such that when in the closed position fluid flow is restricted from at least one of flowing through the primary channel and flowing out of the primary channel and into the auxiliary channel.

Embodiment 2

A fluid manifold assembly comprising: a fluid manifold comprising a body, wherein the body comprises: a proximal end; a distal end; a primary manifold component extending from the proximal end of the body to the distal end of the body and enclosing a primary channel; at least one auxiliary manifold component diverging from the primary manifold component and enclosing an auxiliary channel connected to the primary channel at a primary channel exit port; and at least one compression valve region disposed along the body that is operable between an open position and a closed position such that when in the closed position fluid flow is restricted from at least one of flowing through the primary channel and flowing out of the primary channel and into the auxiliary channel; and a clamping component disposed at each of the at least one compression valve regions of the fluid manifold.

Embodiment 3

The fluid manifold of embodiment 1, wherein the compression valve region is a primary compression manifold valve disposed along the primary manifold component such that when in the closed position fluid flow is restricted from flowing through the primary channel.

Embodiment 4

The fluid manifold of any one of embodiments 1 and 3, wherein the compression valve region is disposed along the primary manifold between the primary channel exit port and the distal end of the body.

Embodiment 5

The fluid manifold of any one of embodiments 1, 3, and 4, wherein the compression valve region is disposed along the primary manifold such that when in the closed position the auxiliary channel is generally coterminous with the primary channel.

Embodiment 6

The fluid manifold of any one of embodiments 1, 3, 4 and 5, wherein the primary channel has an average diameter $D_{PC}$ and a first axis along its length between the proximal end of the body and the distal end of the body, wherein the auxiliary channel has an average diameter $D_{AC}$ and a second axis along its length, wherein the compression valve region is disposed along the primary manifold such that when in the closed position, the primary channel and the auxiliary channel intersect to form an elbow bend that is contained within a volume defined by a sphere, where the sphere has a diameter equal to the larger of $D_{PC}$ and $D_{AC}$, and wherein the sphere is centered at an intersection of the first axis and the second axis.

Embodiment 7

The fluid manifold of embodiment 6, wherein the primary channel extends to a distance of no more than $0.4*D_{AC}$, or no more than $0.3*D_{AC}$, or no more than $0.25*D_{AC}$, or no more than $0.2*D_{AC}$, or no more than $0.15*D_{AC}$, or no more than $0.1*D_{AC}$, or no more than $0.05*D_{AC}$, or no more than $0.01*D_{AC}$ beyond a distal edge of the auxiliary channel.

Embodiment 8

The fluid manifold of embodiment 6, wherein the elbow bend has a right angle, wherein the elbow bend has an acute angle, wherein the elbow bend has an obtuse angle.

Embodiment 9

The fluid manifold of embodiment 6, wherein an axis of the primary channel is perpendicular to an axis of at least one of the auxiliary channels.

Embodiment 10

The fluid manifold of embodiment 1, wherein the compression valve region is a primary channel exit port valve disposed along the body of the fluid manifold such that when the primary channel exit port valve is in the closed position fluid flow is restricted from flowing out of the primary channel and into the auxiliary channel.

Embodiment 11

The fluid manifold of any one of embodiments 1 and 10, wherein the compression valve region is disposed along the body of the fluid manifold at the primary channel exit port.

Embodiment 12

The fluid manifold of any one of embodiments 1, 10, and 11, wherein the compression valve region is disposed along the body of the fluid manifold such that when the compression valve region is in the closed position, a compressed portion of the valve region that restricts fluid flow out of the primary channel and into the auxiliary channel is generally flush with an interior wall of the primary manifold component.

Embodiment 13

The fluid manifold of any one of embodiments 1, 10, 11, and 12, wherein the compression valve region is disposed along the primary manifold component such that when in the closed position, a region of the primary channel spanning the length of the compression valve region has a Longitudinal Dead Space Factor (LDSF) of not greater than about 0.5, where LDSF=$|ACP_{PC}-ACP_{CR}|/ACP_{PC}$, where $ACP_{PC}$ is equal to an average cross-sectional perimeter of the primary channel between the proximal end of the body and the distal end of the bod, and where $ACP_{CR}$ is equal to an average cross-sectional perimeter of the primary channel panning the length of the compression valve region.

Embodiment 14

The fluid manifold of embodiment 8, wherein the compression valve region is disposed along the primary manifold component such that when in the closed position, the region of the primary channel spanning the length of the compression valve region has a Longitudinal Dead Space Factor (LDSF) of not greater than about 0.45 or 0.4 or 0.35 or 0.3 or 0.25 or 0.2 of 0.15 or 0.1 or 0.01.

Embodiment 15

The fluid manifold of any one of the previous embodiments, wherein the compression valve region is configured to be in a closed position under an asserted pressure of not greater than about 20 N or not greater than about 19 N or not greater than about 18 N or not greater than about 17 N or not greater than about 16 N or not greater than about 15 N or not greater than about 14 N or not greater than about 13 N or not greater than about 12 N or not greater than about 11 N or not greater than about 10 N or not greater than about 9 N or not greater than about 8 N or not greater than about 7 N or not greater than about 6 N or not greater than about 5 N.

Embodiment 16

The fluid manifold of any one of the previous embodiments, wherein the compression valve region has an average thickness $AT_{CVR}$, wherein the primary manifold component has an average thickness $AT_{PMC}$ and wherein is $AT_{CVR}$ is different from $AT_{PMC}$.

Embodiment 17

The fluid manifold of embodiment 16, wherein the average thickness of the compression valve region $AT_{CVR}$ is not greater than 0.9 $AT_{PMC}$ or not greater than 0.8 $AT_{PMC}$ or not greater than 0.7 $AT_{PMC}$ or not greater than 0.6 $AT_{PMC}$ or not greater than 0.5 $AT_{PMC}$ or not greater than 0.4 $AT_{PMC}$ or not greater than 0.3 $AT_{PMC}$ or not greater than 0.2 $AT_{PMC}$.

Embodiment 18

The fluid manifold of any one of the previous embodiments, wherein the compression valve region has an average tensile strength $TS_{CR}$, wherein the primary manifold component has an average tensile strength $TS_{PMC}$ and wherein $TS_{CR}$ is different from $TS_{PMC}$.

Embodiment 19

The fluid manifold of embodiment 18, wherein the average tensile strength of the compression valve region $TS_{CR}$ is not greater than 0.9 $TS_{PMC}$ or not greater than 0.8 $TS_{PMC}$ or not greater than 0.7 $TS_{PMC}$ or not greater than 0.6 $TS_{PMC}$ or not greater than 0.5 $TS_{PMC}$ or not greater than 0.4 $TS_{PMC}$ or not greater than 0.3 $TS_{PMC}$ or not greater than 0.2 $TS_{PMC}$.

Embodiment 20

The fluid manifold of any one of the previous embodiments, wherein the compression valve region has an average density $DN_{CR}$, wherein the primary manifold component has an average density $DN_{PMC}$ and wherein $DN_{CR}$ is different from $DN_{PMC}$.

Embodiment 21

The fluid manifold of embodiment 20, wherein the average density of the compression valve region $DN_{CR}$ is not greater than 0.9 $DN_{PMC}$ or not greater than 0.8 $DN_{PMC}$ or not greater than 0.7 $DN_{PMC}$ or not greater than 0.6 $DN_{PMC}$ or not greater than 0.5 $DN_{PMC}$ or not greater than 0.4 $DN_{PMC}$ or not greater than 0.3 $DN_{PMC}$ or not greater than 0.2 $TC_{PMC}$.

Embodiment 22

The fluid manifold of any one of the previous embodiments, wherein the compression valve region and the primary manifold component are configured in distinct shapes.

Embodiment 23

The fluid manifold of embodiment 22, wherein the compression valve region comprises an impression extending into the primary manifold component.

Embodiment 24

The fluid manifold of embodiment 22, wherein the compression valve region comprises a protuberance protruding out of the primary manifold component.

Embodiment 25

The fluid manifold of any one of the previous embodiments, wherein the primary channel has no dead zone.

Embodiment 26

The fluid manifold of any one of the previous embodiments, wherein the primary channel is rectilinear.

Embodiment 27

The fluid manifold of any one of the previous embodiments, wherein the primary channel has an inner diameter larger than the diameter of each of the auxiliary channels.

Embodiment 28

The fluid manifold of any one of the previous embodiments, wherein the primary channel has an inner diameter equal to the diameter of each of the auxiliary channels.

Embodiment 29

The fluid manifold of any one of the previous embodiments, wherein the primary channel has an average diameter $D_{PC}$ and a first axis along its length between the proximal end of the body and the distal end of the body, wherein the auxiliary channel has an average diameter $D_{AC}$ and a second axis along its length, wherein the fluid manifold comprises a ratio of $D_{PC}/D_{AC}$ of at least 0.01, or at least 0.05, or at least 0.1, or at least 0.2, or at least 0.3, or at least 0.4, or at least 0.5, or at least 0.6, or at least 0.7, or at least 0.8, or at least 0.9.

Embodiment 30

The fluid manifold of any one of the previous embodiments, wherein the fluid manifold comprises a ratio of $D_{DC}/D_{AC}$ of not greater than 0.99, or not greater than 0.9, or not greater than 0.8, or not greater than 0.7, or not greater than 0.6, or not greater than 0.5, or not greater than 0.4, or not greater than 0.3, or not greater than 0.2, or not greater than 0.1, or not greater than 0.05.

Embodiment 31

The fluid manifold of any one of the previous embodiments, wherein the primary channel comprises an average diameter $D_{DC}$ of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 32

The fluid manifold of any one of the previous embodiments, wherein the primary channel comprises an average diameter $D_{DC}$ of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 33

The fluid manifold of any one of the previous embodiments, wherein the at least one auxiliary channel has an average diameter $D_{AC}$ of at least 1 mm, or at least 2 mm, or at least 5 mm, or at least 10 mm, or at least 15 mm, or at least 20 mm, or at least 25 mm, or at least 30 mm, or at least 35 mm, or at least 40 mm, or at least 45 mm, or at least 50 mm, or at least 55 mm, or at least 60 mm, or at least 65 mm, or at least 70 mm, or at least 75 mm, or at least 80 mm, or at least 85 mm, or at least 90 mm, or at least 95 mm.

Embodiment 34

The fluid manifold of any one of the previous embodiments, wherein the at least one auxiliary channel has an average diameter $D_{AC}$ of not greater than 100 mm, or not greater than 95 mm, or not greater than 90 mm, or not greater than 85 mm, or not greater than 80 mm, or not greater than 75 mm, or not greater than 70 mm, or not greater than 65 mm, or not greater than 60 mm, or not greater than 55 mm, or not greater than 50 mm, or not greater than 45 mm, or not greater than 40 mm, or not greater than 35 mm, or not greater than 30 mm, or not greater than 25 mm, or not greater than 20 mm, or not greater than 15 mm, or not greater than 10 mm, or not greater than 5 mm, or not greater than 2 mm.

Embodiment 35

The fluid manifold of any one of the previous embodiments, wherein the primary channel comprises a circular cross-section.

Embodiment 36

The fluid manifold of any one of the previous embodiments, wherein the primary channel comprises a non-circular cross-section.

Embodiment 37

The fluid manifold of any one of the previous embodiments, the auxiliary channel comprises a circular cross-section.

Embodiment 38

The fluid manifold of any one of the previous embodiments, wherein the auxiliary channel comprises a non-circular cross-section.

Embodiment 39

The fluid manifold of any one of the previous embodiments, wherein the fluid manifold comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

Embodiment 40

The fluid manifold of any one of the previous embodiments, wherein the distal support comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

Embodiment 41

The fluid manifold of any one of the previous embodiments, wherein the fluid manifold comprises an embedded reinforcement material.

Embodiment 42

The fluid manifold of any one of the previous embodiments, wherein the fluid manifold comprises an embedded reinforcement material, wherein the reinforcement material comprises polyester, adhesion modified polyester, polyamide, polyaramid, or stainless steel.

Embodiment 43

The fluid manifold of any one of the previous embodiments, wherein the fluid manifold comprises an embedded reinforcement material, wherein the reinforcement material comprises wire or strands.

Embodiment 44

The fluid manifold of any one of the previous embodiments, wherein the fluid manifold comprises an embedded reinforcement material, wherein the reinforcement material comprises braided wire or braided strands.

Embodiment 45

The fluid manifold of any one of the previous embodiments, wherein the fluid manifold is encased by a reinforcement shell.

Embodiment 46

The fluid manifold of any one of the previous embodiments, wherein the fluid manifold is encased by a reinforcement shell, and wherein the reinforcement shell comprises a polymer, a thermoplastic, such as polypropylene.

Embodiment 47

The fluid manifold of any one of the previous embodiments, wherein the fluid manifold is encased by a reinforcement shell, and wherein the reinforcement shell comprises a thermoplastic.

Embodiment 48

The fluid manifold of any one of the previous embodiments, wherein the fluid manifold is encased by a reinforcement shell, and wherein the reinforcement shell comprises polypropylene.

Embodiment 49

The fluid manifold assembly of embodiment 2, wherein the assembly further comprises a primary tube overmolded to the primary channel of the fluid manifold.

Embodiment 50

The fluid manifold assembly of embodiment 2, wherein the assembly further comprises an auxiliary tube overmolded to each of the at least one auxiliary channels.

Embodiment 51

The fluid manifold of any one of the previous embodiments, wherein each tube has an inner diameter that corresponds to an inner diameter of the channel at the opening adjacent the tube.

Embodiment 52

The fluid manifold of any one of the previous embodiments, wherein each of the tubes comprises a polymer.

Embodiment 53

The fluid manifold of any one of the previous embodiments, wherein each of the tubes comprises a thermoplastic, thermoset, elastomer, thermoplastic elastomer, or engineering thermoplastic elastomer.

Embodiment 54

The fluid manifold of any one of the previous embodiments, wherein each of the tubes comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

Embodiment 55

The fluid manifold of any one of the previous embodiments, wherein the fluid manifold comprises an embedded reinforcement material.

Embodiment 56

The fluid manifold of any one of the previous embodiments, wherein the fluid manifold comprises an embedded reinforcement material, wherein the reinforcement material comprises polyester, adhesion modified polyester, polyamide, polyaramid, or stainless steel.

Embodiment 57

The fluid manifold of any one of the previous embodiments, wherein the fluid manifold comprises an embedded reinforcement material, wherein the reinforcement material comprises wire or strands.

Embodiment 58

The fluid manifold of any one of the previous embodiments, wherein the fluid manifold comprises an embedded reinforcement material, wherein the reinforcement material comprises braided wire or braided strands.

Embodiment 59

The fluid manifold of any one of the previous embodiments, wherein the fluid manifold is encased by a reinforcement shell.

Embodiment 60

The fluid manifold of any one of the previous embodiments, wherein the fluid manifold is encased by a reinforcement shell, and wherein the reinforcement shell comprises a polymer, a thermoplastic, such as polypropylene.

Embodiment 61

The fluid manifold of any one of the previous embodiments, wherein the fluid manifold is encased by a reinforcement shell, and wherein the reinforcement shell comprises a thermoplastic.

Embodiment 62

The fluid manifold of any one of the previous embodiments, wherein the fluid manifold is encased by a reinforcement shell, and wherein the reinforcement shell comprises polypropylene.

The foregoing embodiments represent a departure from the state-of-the-art. Notably, the fluid manifold and the method of making a fluid manifold described herein include a combination of features not previously recognized in the art and facilitate performance improvements. Such features can include, the inclusion of a but are not limited to, the inclusion of a compression valve region in the body of a fluid manifold at a location that eliminates excess or dead spaced within the fluid manifold particularly at locations near or adjacent to auxiliary exit ports of the manifold. The fluid manifolds described herein have demonstrated remarkable and unexpected improvements over state-of-the-art manifolds. In particular, they have shown improved fluid flow, reduced fluid stagnation, low cost, durability, ease of manufacture, and ease of use.

Note that not all of the activities described above in the general description are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A fluid manifold comprising a body, wherein the body comprises:
   a proximal end;
   a distal end;
   a primary manifold component extending from the proximal end of the body to the distal end of the body and enclosing a primary channel;
   at least one auxiliary manifold component diverging from the primary manifold component and enclosing an auxiliary channel connected to the primary channel at a primary channel exit port; and
   at least one compression valve region that is operable between an open position and a closed position such that when in the closed position fluid flow is restricted from at least one of flowing through the primary channel and flowing out of the primary channel and into the auxiliary channel, wherein an average thickness $AT_{CVR}$ of the compression valve region is different from the average thickness $AT_{PMC}$ of the primary manifold component, wherein the fluid manifold is encased by a reinforced shell.

2. A fluid manifold assembly comprising:
   a fluid manifold comprising a body, wherein the body comprises:
   a proximal end;
   a distal end;
   a primary manifold component extending from the proximal end of the body to the distal end of the body and enclosing a primary channel;
   at least one auxiliary manifold component diverging from the primary manifold component and enclosing an auxiliary channel connected to the primary channel at a primary channel exit port; and
   at least one compression valve region that is operable between an open position and a closed position such that when in the closed position fluid flow is restricted from at least one of flowing through the primary channel and flowing out of the primary channel and into the auxiliary channel; and
   a clamping component disposed at each of the at least one compression valve regions of the fluid manifold, wherein the clamping component comprises at least one of cylinders, levers, and gearing, wherein an average thickness $AT_{CVR}$ of the compression valve region is different from the average thickness $AT_{PMC}$ of the primary manifold component, wherein the fluid manifold is encased by a reinforcement shell.

3. The fluid manifold of claim 1, wherein the compression valve region is a primary compression manifold valve disposed along the primary manifold component such that when in the closed position fluid flow is restricted from flowing through the primary channel.

4. The fluid manifold of claim 1, wherein the compression valve region is disposed along the primary manifold between the primary channel exit port and the distal end of the body.

5. The fluid manifold of claim 1, wherein the compression valve region is disposed along the primary manifold such that when in the closed position the auxiliary channel is generally coterminous with the primary channel.

6. The fluid manifold of claim 1, wherein the primary channel has an average diameter $D_{PC}$ and a first axis along its length between the proximal end of the body and the distal end of the body, wherein the auxiliary channel has an average diameter $D_{AC}$ and a second axis along its length, wherein the compression valve region is disposed along the primary manifold such that when in the closed position, the primary channel and the auxiliary channel intersect to form an elbow bend that is contained within a volume defined by a sphere, where the sphere has a diameter equal to the larger of $D_{PC}$ and $D_{AC}$, and wherein the sphere is centered at an intersection of the first axis and the second axis.

7. The fluid manifold of claim 6, wherein the elbow bend has a right angle, wherein the elbow bend has an acute angle, or wherein the elbow bend has an obtuse angle.

8. The fluid manifold of claim 6, wherein an axis of the primary channel is perpendicular to an axis of at least one of the auxiliary channels.

9. The fluid manifold of claim 1, wherein the compression valve region is a primary channel exit port valve disposed along the body of the fluid manifold such that when the primary channel exit port valve is in the closed position fluid flow is restricted from flowing out of the primary channel and into the auxiliary channel.

10. The fluid manifold of claim 1, wherein the compression valve region is disposed along the body of the fluid manifold at the primary channel exit port.

11. The fluid manifold of claim 1, wherein the compression valve region is disposed along the body of the fluid manifold such that when the compression valve region is in the closed position, a compressed portion of the valve region that restricts fluid flow out of the primary channel and into the auxiliary channel is generally flush with an interior wall of the primary manifold component.

12. The fluid manifold of claim 1, wherein the compression valve region is disposed along the primary manifold component such that when in the closed position, a region of the primary channel spanning the length of the compression valve region has a Longitudinal Dead Space Factor (LDSF) of not greater than about 0.5, where LDSF=I $ACP_{PC}$ - $ACP_{CR}$ I/$ACP_{PC}$, where $ACP_{PC}$ is equal to an average cross-sectional perimeter of the primary channel between the proximal end of the body and the distal end of the bod, and where $ACP_{CR}$ is equal to an average cross-sectional perimeter of the primary channel panning the length of the compression valve region.

13. The fluid manifold of claim 1, wherein the compression valve region comprises an impression extending into the primary manifold component.

14. The fluid manifold of claim 1, wherein the compression valve region comprises a protuberance protruding out of the primary manifold component.

15. The fluid manifold of claim 1, wherein the fluid manifold comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

16. The fluid manifold of claim 1, wherein the distal end comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

17. The fluid manifold assembly of claim 2, wherein the assembly further comprises a primary tube overmolded to the primary channel of the fluid manifold.

18. The fluid manifold assembly of claim 2, wherein the assembly further comprises an auxiliary tube overmolded to each of the at least one auxiliary channels.

19. The fluid manifold of claim 17, wherein each of the tubes comprises silicone, thermoplastic elastomer (TPE), thermoplastic vulcanizate (TPV), thermoplastic polyurethane (TPU), flexible polyvinyl chloride (fPVC), polyalkylsiloxanes, dimethylsiloxane, diethylsiloxane, dipropylsiloxane, methylethylsiloxane, methylpropylsiloxane, polydialkylsiloxane, polydimethylsiloxane (PDMS), polypropylene, or poly[vinylidene fluoride] (PVDF).

* * * * *

UNITED STATES PATENT AND TRADEMARK OFFICE
CERTIFICATE OF CORRECTION

PATENT NO. : 10,851,931 B2  
APPLICATION NO. : 16/158436  
DATED : December 1, 2020  
INVENTOR(S) : Clemens E. Zoellner et al.

Page 1 of 1

It is certified that error appears in the above-identified patent and that said Letters Patent is hereby corrected as shown below:

In the Claims

Column 29, Line 44, please delete "LDSF=I", and insert --LDSF=|--

Column 30, Line 1, please delete "I/ACP$_{PC}$", and insert --|/ACP$_{PC}$--

Column 30, Line 3, please delete "bod", and insert --body--

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*